(12) United States Patent
Njolstad et al.

(10) Patent No.: US 10,296,078 B2
(45) Date of Patent: May 21, 2019

(54) LOW INTERFERENCE SYSTEM AND METHOD FOR SYNCHRONIZATION, IDENTIFICATION AND TRACKING OF VISUAL AND INTERACTIVE SYSTEMS

(71) Applicant: EPSON NORWAY RESEARCH AND DEVELOPMENT AS, Trondheim (NO)

(72) Inventors: Tormod Njolstad, Trondheim (NO); Oystein Damhaug, Oslo (NO); Hallvard Naess, Trondheim (NO); Karol Marcin Pawlak, Sjetnemarka (NO); Sverre Dale Moen, Oslo (NO)

(73) Assignee: SEIKO EPSON CORPORATION, Tokyo (JP)

( * ) Notice: Subject to any disclaimer, the term of this patent is extended or adjusted under 35 U.S.C. 154(b) by 98 days.

(21) Appl. No.: 15/479,986

(22) Filed: Apr. 5, 2017

(65) Prior Publication Data

US 2017/0205906 A1    Jul. 20, 2017

Related U.S. Application Data

(63) Continuation of application No. 14/371,082, filed as application No. PCT/IB2013/000335 on Jan. 3, 2013, now Pat. No. 9,652,029.

(Continued)

(51) Int. Cl.
*G06F 3/01* (2006.01)
*G06F 3/038* (2013.01)
(Continued)

(52) U.S. Cl.
CPC .............. *G06F 3/01* (2013.01); *G06F 3/0386* (2013.01); *G06F 3/03542* (2013.01); *G06F 3/0425* (2013.01)

(58) Field of Classification Search
CPC ... G06F 3/03542; G06F 3/0386; G06F 3/0421
See application file for complete search history.

(56) References Cited

U.S. PATENT DOCUMENTS

2001/0050672 A1   12/2001   Kobayashi
2002/0142818 A1   10/2002   Nakatsuka et al.
(Continued)

FOREIGN PATENT DOCUMENTS

| | | |
|---|---|---|
| CN | 102135842 A | 7/2011 |
| EP | 2 696 267 A1 | 2/2014 |
| JP | 2009-289243 A | 12/2009 |

OTHER PUBLICATIONS

Feb. 21, 2018 Extended European Search Report issued in European Patent Application No. 17206664.9.

(Continued)

*Primary Examiner* — Kevin M Nguyen
(74) *Attorney, Agent, or Firm* — Oliff PLC

(57) ABSTRACT

A visual system includes one or more units, where each unit is a displaying unit or a video camera, or a combination of both, and each unit has a receiver. The unit has a transmitter which starts transmitting infrequent, short repetitive bursts if no bursts are received by the receiver; and otherwise transmits a delayed short burst synchronized to the infrequent, short repetitive bursts by the transmitter, in order to synchronize all units in the visual system to each other, while the infrequent, short repetitive bursts will not interfere nor will be interfered by the general use of remote controllers for other purposes.

8 Claims, 26 Drawing Sheets

| Strobe number for ID1 sequence | Pen phase 1 for ID1 sequence | Pen phase 2 for ID1 sequence | Pen phase 3 for ID1 sequence |
|---|---|---|---|
| 1 | 1 | 0 if tip pressed | 1 |
| 2 | 1 | 1 if tip pressed | 1 |
| 3 | 1 | 1 if tip pressed | 1 |

| Strobe number for ID2 sequence | Pen phase 1 for ID2 sequence | Pen phase 2 for ID2 sequence | Pen phase 3 for ID2 sequence |
|---|---|---|---|
| 1 | 1 | 0 if tip pressed | 1 |
| 2 | 1 | 1 if tip pressed | 1 |
| 3 | 1 | 1 if tip pressed | 1 |
| 4 | 1 | 1 if tip pressed | 1 |

Related U.S. Application Data

(60) Provisional application No. 61/601,414, filed on Feb. 21, 2012, provisional application No. 61/584,620, filed on Jan. 9, 2012.

(51) Int. Cl.
  *G06F 3/042* (2006.01)
  *G06F 3/0354* (2013.01)

(56) References Cited

U.S. PATENT DOCUMENTS

| | | |
|---|---|---|
| 2003/0037335 A1 | 2/2003 | Gatto et al. |
| 2005/0073508 A1 | 4/2005 | Pittel et al. |
| 2006/0106963 A1 | 5/2006 | Sasaki et al. |
| 2006/0170874 A1 | 8/2006 | Yumiki et al. |
| 2008/0169132 A1 | 7/2008 | Ding et al. |
| 2009/0315829 A1 | 12/2009 | Maison et al. |
| 2011/0109554 A1 | 5/2011 | Boissier |
| 2011/0148758 A1* | 6/2011 | Hashimoto ......... G06F 3/03542 345/157 |
| 2011/0169736 A1 | 7/2011 | Bolt et al. |
| 2012/0162204 A1 | 6/2012 | Vesely et al. |

OTHER PUBLICATIONS

Feb. 2, 2016 Office Action issued in U.S. Appl. No. 14/371,082.
Jun. 7, 2016 Office Action issued in U.S. Appl. No. 14/371,082.
Jun. 28, 2016 Office Action issued in Chinese Application No. 201380013062.X.
Jul. 1, 2016 Office Action issued in Taiwanese Patent Application No. 102100770.
Sep. 14, 2016 Office Action issued in U.S. Appl. No. 14/371,082.
Oct. 24, 2016 Office Action issued in Taiwanese Patent Application No. 102100770.
Sep. 1, 2015 Office Action issued in U.S. Appl. No. 14/371,082.

\* cited by examiner

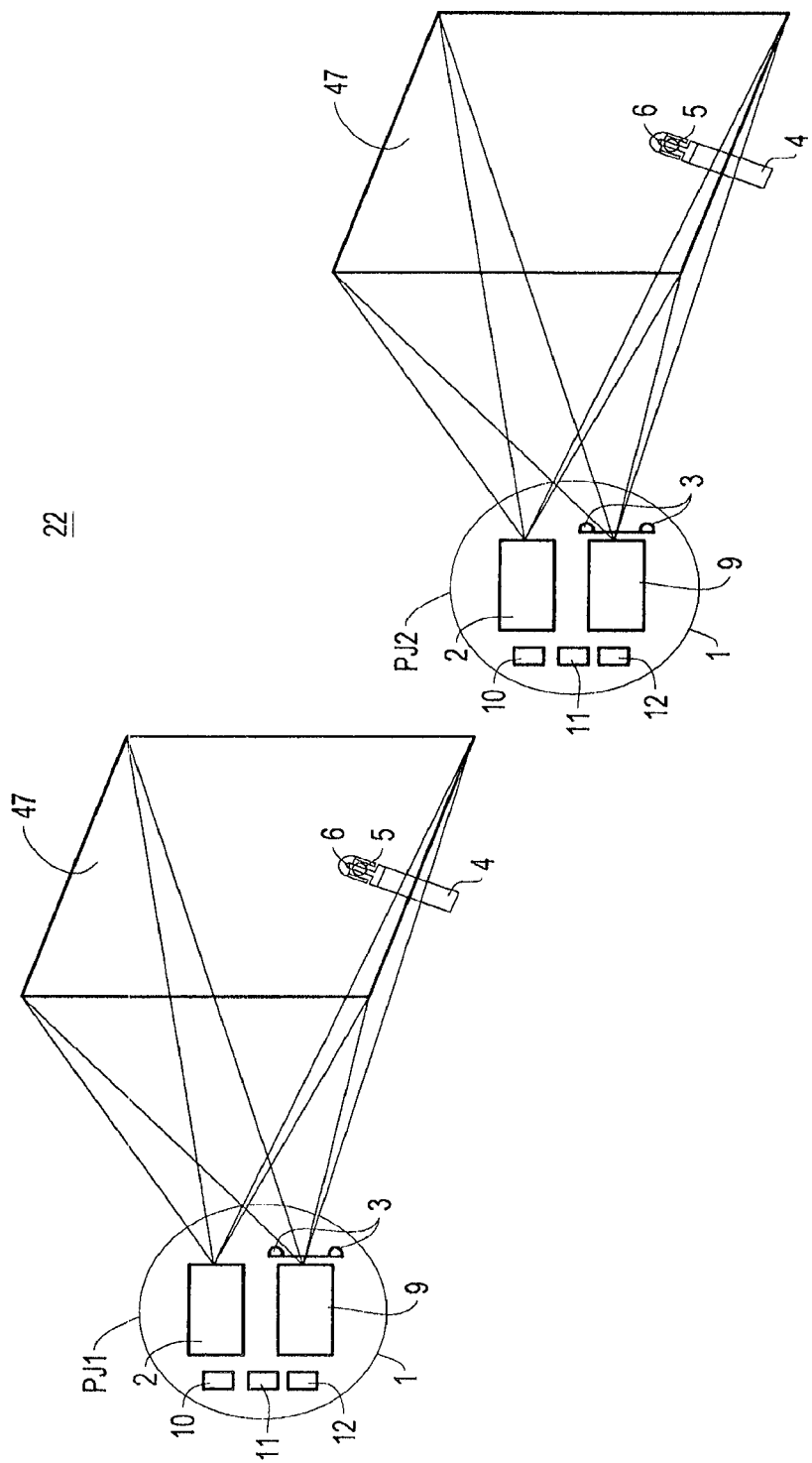

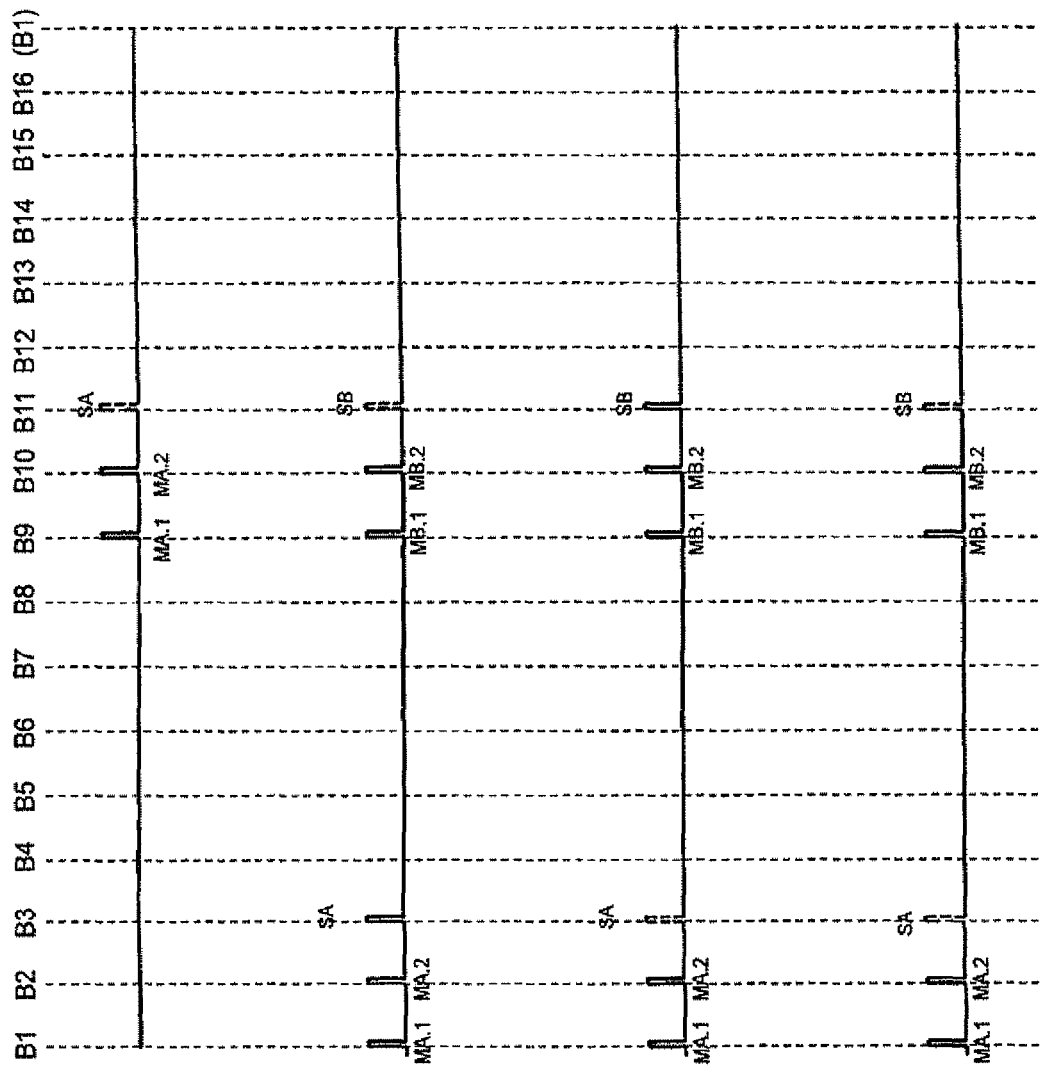

| Parameter name and typical value in an exemplary configuration: | Used in state-transition | Description |
|---|---|---|
| T1 | 10s | S3 → S6 | If the unit is not receiving a valid synchronization burst within a time interval T1 or T1B, randomly selected, the unit will leave state S3 and enter S6 Master state. |
| T1B | 15s | S3 → S6 | |
| T2 | 60s | S3 → S6 | If appearantly some synchronization pulses are received, but the system is not able to synchronize during the time period T2, the unit will give up and leave state S3 and enter state S6 Master. |
| T3 | 2s | S2 → S6 | If there is no burst received at all within the time interval T3 or T3B, randomly selected, the unit will leave state S2 Silence test( or state S3 Synchronize test) and enter state S6 Master. |
| T3B | 4.4s | | |
| T5 | 3s | S4 → S9 | If synchronization is successful, the unit is in state S4 Keep synch, but will within a time interval T1 or T1B, randomly selected, the unit will leave state S4 and enter state S9 Update receiver delay, to periodically measure the delay in the receiver, before it returns back to state S4 Keep synch. |
| T5B | 8s | | |
| T6 | 10s | S4 → S5 | If synchronization bursts are vanishing for a time interval of T6, the unit leaves state S4 Keep synch and enters state S5 Background check to look for other bursts. If then the synchronization burst is occuring again it returns to state S4 Keep synch. |
| T7 | 60min | S5 → S6 | If there is no other unit's synchronization burst detected for T7 minutes, the unit considered itself as being alone, and leaves the state S5 Background check and enters the state S6 Master. |
| T8 | 10s | S5 → S10 | If other burst source is continously detected within a time T8 or T9, randomly selected, the unit will leave state S5 and enter the state S10 Valid synch burst check without transmitting, to check that there are no other's synchronization burst sequence which are masked by own transmission. |
| T9 | 20s | | |
| T10 | 10s | S8 → S6 | If there are some noise (unsynchronized bursts) detected continuously within a time interval T10 or T11, randomly selected, the unit will leave state S6 Master and will enter state S8 Valid synch burst check without transmitting, to check that there are no other's synchronization burst sequence which are masked by own transmission. |
| T11 | 20s | | |

FIG. 5B

| Strobe number for ID1 sequence | Pen phase 1 for ID1 sequence | Pen phase 2 for ID1 sequence | Pen phase 3 for ID1 sequence |
|---|---|---|---|
| 1 | 1 | 0 if tip pressed | 1 |
| 2 | 1 | 1 if tip pressed | 1 |
| 3 | 1 | 1 if tip pressed | 1 |

| Strobe number for ID2 sequence | Pen phase 1 for ID2 sequence | Pen phase 2 for ID2 sequence | Pen phase 3 for ID2 sequence |
|---|---|---|---|
| 1 | 1 | 0 if tip pressed | 1 |
| 2 | 1 | 1 if tip pressed | 1 |
| 3 | 1 | 1 if tip pressed | 1 |
| 4 | 1 | 1 if tip pressed | |

LOW INTERFERENCE SYSTEM AND METHOD FOR SYNCHRONIZATION, IDENTIFICATION AND TRACKING OF VISUAL AND INTERACTIVE SYSTEMS

FIELD OF THE INVENTION

The invention relates generally to a system and method for synchronization of visual systems and in particular interactive data projectors, where the synchronization further includes system and method for identification and tracking to be incorporated in pen, camera and touch input devices, such that such visual systems do not interfere or disturb general remote controllers or receivers, and further that such two or more such visual systems are synchronized to each other and can co-operate.

BACKGROUND OF THE INVENTION

Interactive data projectors create interactive surfaces like those found in physical interactive whiteboards and interactive flat screens, but the coordinate data and even user activation information (touch on, touch off, tip pressed, tip released) are extracted from images by using camera technology located at the projector, instead of using electromagnetic, optical or acoustical methods embedded into the surface itself. Examples of camera based interactive technology suited for projectors are e.g. disclosed by the present inventor and applicant by WO2001NO00369/U.S. Pat. No. 7,083,100B2 and/or WO2006135241A1/US2009040195A1 using pens with optical patterns which can be tracked by the camera and image recognition system. Other systems are: JP3257585: Visual Science Lab. File: 29 Mar. 1996 Tokuganhei 08-075950) which discloses a camera with IR emitter and a pointing device with reflector, where the camera detects IR and finds out the position of the pointing device, but any synchronization between Camera and Pointing device has not been disclosed. The JP4728540: (Ricoh, File 20 Sep. 2001 Tokugan 2001-287901) discloses a pointing device with some pattern on reflector and a camera which detects a light with the code pattern of the pointing device and find out control information. The JP4037822 (NEC Device Solutions, File: 5 Dec. 2003 Tokugan 2003-407884) discloses a pointing device, which receives a light signal from the camera, and a pointing device that emits a light in response to emitting signal from the camera. The U.S. Pat. No. 6,529,189 (IBM, File 8 Feb. 2000 US09/500194) discloses a pointing device that has IR component and emit a light including control information and camera receives the light.

SUMMARY OF THE INVENTION

It is an aspect of the present invention to provide a system and a method for visual and interactive visual systems, comprising units like projectors or displays, cameras and associated specifically optical input devices, for the synchronization of several such units in that their output content in terms of images and video by projectors or displays or wearable display glasses; their input content in terms of images and video captured by cameras; their illumination function in terms of visual light and/or infrared light; and their user interaction functions in terms of position tracking and input control functions of input interaction tools like pens, pointing sticks, fingers etc.; all are controlled by the same synchronizing control bursts, such that the units can become co-operative including that interactive output events can be initiated timely and concurrently and that interactive input events can be interpreted coherently.

It is further an aspect of the present invention that the interference and disturbance of the synchronization system will be insignificant, namely that the synchronization bursts will occur so seldom that they will not notably disturb, nor will be notably disturbed by, remote controller receivers and remote control transmitters which are typically included in AV-equipment.

Camera technology is simple, but accurate, very fast and reliable, and is also easy to integrate into a data projector or displays. The camera technology is evolving fast in terms of resolution, sensitivity, size and performance. Commercially available image sensors are able to capture still images and video images with e.g. programmable rate, resolution, size, gain and exposure time.

In the further description of the present invention, a camera is to be understood as comprising an image sensor and a lens suitable to capture images and comprising communication means to transfer the captured images as input to a computer, further the camera may also include image processing means to perform feature extraction, object recognition and object tracking in order to detect and follow certain details having special features, further to interpret these details by comparing and matching them to data models of some specified interaction objects and mapping the result into interaction surface or interaction space coordinates to determine the interaction objects' position and orientation, and further the camera may include interpretation of the intensity levels of certain details in a sequence of captured images to extract interaction object identification and user interaction actions like tip switch pressed, tip switch released, button pressed, button released, finger touch or finger not touch etc, and further the camera may include communication means to transfer detected interaction objects' identification, position, orientation, and user interaction actions as input to a computer.

Aspects of the invention relate to camera-based, interactive projectors wherein utilizing near infrared light (NIR) for illumination, tracking and identification, and further discloses how to effectively synchronize pens and projectors by using infrared transmission or radio frequency transmission. Aspects of the inventive method include how the pen and the camera unit of an interactive projector are synchronized to reduce power consumption and increase battery life time in pen; further are synchronized to freeze movements and increase signal/noise ratio, and further how a number of pens and camera units belonging to several interactive projectors in a room are synchronized to further provide interoperability between several projectors and pens, and not introducing intolerable interference with remote controllers present for other purposes. Furthermore, the same principle of synchronization can optionally be used to: synchronize the projected images of several projectors; synchronize the images of several flat panel displays; synchronize the display panels of multimedia glasses; synchronize the active 3D shutters of 3D goggles and synchronize several camera's exposure in a room,—within an accuracy of a few microseconds, without disturbing other remote controllers' function in the same room, due to the low communication traffic required for this synchronization. The synchronization principles can utilize a standard near infrared receiver and transmitter, which are low-cost components in remote control functions in consumer and professional electronic equipment. The synchronization can optionally utilize a standard low-cost radio frequency receiver and transmitter, which are low-cost components in remote control functions in consumer and professional electronic equipment.

It is further an aspect of the present invention to accommodate the most effective power budget for the visual and/or near-infrared illuminant and the most effective power budget for the near-infrared emitting diode (IRED) in the pen and other active interaction devices. To ensure an effective power budget is important to limit heating and increase life time of the illumination light sources and the IRED components, to reduce cost and size of power control circuits and power supplies, and to minimize the power consumption in battery operated equipment to maximize battery life time.

It is further an aspect of the present invention to accommodate the best signal to noise ratio of the images and video captured by the camera units, by the accurate synchronization of the flashing of the illuminant to the cameras' global shutter and the accurate synchronization of the flashing of the IREDs in the pen and other active interaction devices to the cameras' global shutter.

It is further an aspect of the present invention that smearing, due to rapid movements of objects in the scene, will be effectively reduced by the aforementioned tightly synchronized flashing to the cameras' global shutter.

It is also an aspect of the present invention to synchronize a data projector or flat panel display to 3D shutter glasses, or optionally providing larger and/or wider 3D displays by synchronizing two or more projectors or displays to the 3D shutter glasses. Examples of active 3D shutter glasses used together with projectors is described in patent US2012033057 (A1): ELECTRO-OPTIC DEVICE AND STEREOSCOPIC VISION DISPLAY APPARATUS by Hirosada HORIGUCHI of Seiko Epson Corp, Japan, published Feb. 9, 2012. The WO2012/005968 (A1) by SONY CORPORATION, Japan, describes an example of a shutter glass repeater system based on a combination of RF and IR signals, but which is dependent on using a adapted television remote controller unit to do different kind of conversions and repeater functions to extend the range and to implement their proposed synchronization scheme. The proposed Listen and Repeat scheme in the present invention will simplify the signal requirements and remove the need for a remote controller unit to implement the synchronization functions. One advantage of the innovative Listen and Repeat principle implies that the short bursts for the units' synchronization are spread over the room by the units themselves.

It is further an aspect of the present invention to synchronize wearable semi-transparent display glasses (multimedia glasses) with one or more of other aforementioned units, to provide new interactive functions like wearable displays with synchronized interactive functionality as pen or "finger touch" support.

It is further an aspect of the present invention to synchronize wearable semi-transparent display glasses or 3D shutter glasses with one or more of other aforementioned units, to provide 3D or augmented reality functions such the scene the user is perceiving is due to the synchronized output content of projectors and/or displays, as seen through the synchronized semi-transparent display glasses with its associated output content or through the synchronized 3D shutter glasses, and optionally controlled by wearable synchronized cameras, synchronized illumination and/or synchronized interaction objects.

According to the first aspect of the invention, there is provided a visual system comprising one or more units, where the unit is a data projector or display, or is a video camera, or a combination of the both, where the data projector and the display can display images and graphical output from a computer at an image output rate; and the video camera can capture images of objects in a scene at an image input rate; and where the aforementioned unit has a receiver. The unit has a transmitter which starts transmitting a series of infrequent, short repetitive bursts if no such bursts are received by the receiver within a given time; and otherwise is transmitting a delayed short burst synchronized to the infrequent, short repetitive bursts by the transmitter, in order to synchronize all units in the visual system to each other, while the infrequent, short repetitive bursts will not interfere nor will be interfered by the general use of remote controllers for other purposes.

The system is of advantage in that the synchronization is established with infrequent, short repetitive bursts. Since the bursts are infrequent, namely have low repetition rate, the system is allowing wireless remote controller units and wireless remote control receivers to operate in most of the time and thus they will not be notably interfered by the synchronization system. Furthermore the system is of advantage that the synchronization system itself will not be notably affected by other remote control transmitters, as long as their signals are dissimilar to the synchronization bursts in length and repetition rate, and optionally, in coding.

The proposed synchronization system and method can be applied for wireless implementation using NIR/IR receivers and transmitters or RF receivers and transmitters, but the same synchronization principles can also be a wired solution, e.g., by a pair of electrical wires or by an optical fiber. The signal can then be a modulated bursts or be digital without modulation, e.g., using a pulled-up single line connected to open-drain outputs and inputs to make a single bi-directional signal. In some configurations of the present invention a combination of wireless and wired synchronization may be preferable, for example in large lecture rooms where interactive projectors are at the lectern or podium, while some video cameras for capturing the lectures are in the rear end of the room, such that the wireless transmission quality can be too poor to do synchronization by wireless transmission only. Similarly, if two or more visual or interactive visual systems, each consisting of one or more units, according to the present invention, are separated by a large physical distance, they may have different synchronization such that the systems can disturb each other, then a combination of wireless and wired synchronization may be utilized to bring the systems into synchronism across the large physical distance.

According to the second aspect of the invention, there is provided a method of employing a visual system including one or more units. The unit is a data projector or display, or is a video camera, or a combination of the both, where the data projector and the display can display images and graphical output from a computer at a certain rate. The video camera can capture images of objects in a scene at a certain rate, where the aforementioned unit has a receiver. The unit has a transmitter. The method includes starting the transmission of infrequent, short repetitive bursts by the transmitter if no such bursts are received by the receiver within a given time, and otherwise receiving short repetitive bursts by the receiver, and repeating similar bursts after a predefined time by the transmitter, in order to synchronize all units in the visual system to each other, while the bursts will not interfere nor will be interfered by the general use of remote controllers for other purposes.

Aspects of the present invention provide a visual system, where the units which are involved are synchronized to each other.

The synchronization of the units, means that the output rate and exact timing of the output of the projector images and/or the display images are accurately adjusted to an internal synchronization signal, and the internal synchronization signal is based on estimation, namely the averaging of the time series of the starting time of each burst in the sequence of the abovementioned infrequent, short bursts.

Correspondingly, the synchronization of the units, means that the input rate and exact timing of the capturing of images by a camera; the associated exposure control; and optional flashing illuminants are accurately adjusted and related to an internal synchronization signal, and the internal synchronization signal is based on estimation, namely the averaging of the time series of the starting time of each burst in the sequence of the abovementioned infrequent, short bursts.

Correspondingly, the synchronization of the units, means that the timing of the flashing sequence of the at least one near-infrared emitting diode (IRED) included in active interaction objects are adjusted to at least one of the infrequent, short bursts, such that the flashing events in the sequence can be activated at the same time as the camera exposure shutter is active, providing very good exposure of the camera, reducing smearing due to moving objects in the scene and reducing power consumption in the interaction device. With an accurate local crystal based timer included in the interaction device, the flashing events can be correctly timed to the camera exposure shutter even if new bursts are not detected for some seconds.

Correspondingly, the synchronization of the units, means that the timing of the shutter sequence included in wearable active 3D shutter glasses, is adjusted to at least one of the infrequent, short bursts, such that the left and right shutters change shutter state at the appropriate moment relating to when the synchronized projector or display images are set out. With an accurate local crystal based timer included in the 3D shutter glasses, the sequence events can be correctly timed to the synchronized projector or display units even if new bursts are not detected for some seconds.

Correspondingly, the synchronization of the units, means that the timing and the update rate of wearable, and optionally semi-transparent, display glasses, can be adjusted to at least one of the infrequent, short bursts, such that the output images are updated at the appropriate moments relating to e.g. when the synchronized projector or display images are set out. With an accurate local crystal based timer included in the wearable display glasses, the image updating can be correctly timed to the synchronized units even if new bursts are not detected for some seconds.

The update rate of input images, the update rate of output images, the flashing rate of illuminants, the flashing rate of active interaction devices, the shutter rate of 3D shutter glasses; and the update rate of wearable display glasses, may optionally be different, but can in all cases be derived from the same wireless, infrequent, short bursts.

Beneficially, aspects of the present invention include advantages, such as, for example, that the wireless infrequent, short bursts are retransmitted according to a listen and repeat scheme by each unit, such that the wireless infrequent, short bursts are distributed to every corner of a room.

Beneficially, aspects of the present invention include advantages, such as, for example the above mentioned listen and repeat scheme is utilizing simple randomization function for the burst repeating delay, meaning that each unit randomize when to listen for other units' bursts and when to transmit its own synchronized burst. By these advantageous mechanisms, the typical requirement of a dedicated master unit in a system is removed, since all units here can contribute to the spread of a synchronized burst.

DESCRIPTION OF THE DRAWINGS

Aspects of the invention are herein described, by way of examples only, with reference to accompanying drawings, wherein:

FIG. 1 is an illustration of an example configuration of the present invention, wherein the visual system is comprising two synchronized interactive projectors;

FIGS. 2A-2H are an illustration of the listen and repeat with randomised delay synchronization principle of the present invention;

FIG. 5B is an illustration of an example of the synchronization algorithm for the listen and repeat with randomised delay synchronization principle like in FIG. 5A of the present invention, describing further the symbolic time and timeout parameters T1-T11 and their relationship to the state transitions, including possible numerical values for an example configuration;

DESCRIPTION OF EMBODIMENTS OF THE INVENTION

Figure 2A:
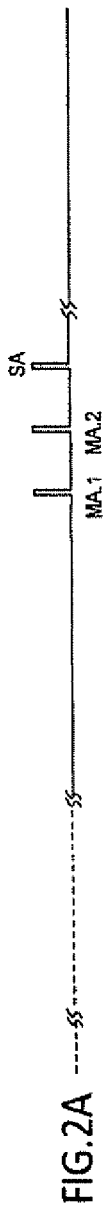

Aspects of the present invention are directed to a system and method for the synchronization of visual and interactive visual systems.

Before describing implementation and operation of at least one embodiment of the invention in detail, it is to be understood that the invention is not limited in its application to the details of construction and the arrangement of the components set forth in the following description or illustrated in the drawings, The invention is capable of being implemented in other embodiments or of being practiced or carried out in various ways. Moreover, it is to be understood that the phraseology and terminology employed herein is for the purpose of description and should not be regarded as limiting.

The principles and operation of the synchronization system and method, according to aspects of the present invention, are better understood with reference to the drawings and the accompanying descriptions.

Firstly, the principle of the visual system and the synchronization of its units are described. Thereafter, the detailed description of some preferred embodiments are described along with its detailed system operation principles.

Principles of operation of the visual system and the synchronization of its units are described by referring to an exemplary configuration as given by FIG. 1, FIG. 18, FIG. 19, FIG. 20, FIG. 21, FIG. 22, FIG. 23 and FIG. 24. The figures schematically illustrated a hardware configuration of a preferred embodiment.

In FIG. 1 the hardware configuration includes an interactive visual system 22 comprising two or more units 1, here denoted PJ1 and PJ2, each comprising a displaying device, namely a projector 2 projecting an output image onto the projection and interaction surface 47, a camera 9 capturing the projection and interaction surface 47 with an optional illuminant 3 illuminating the projection and interaction surface 47, a wireless receiver 11, a wireless transmitter 12, a computational and data collection means 10 like a microcontroller or an application specific digital circuit, and an interaction object 4. The interaction object 4 may comprise at least one passive optical detail 5 or one active optical detail 6, adapted to be detectable by the camera 9. The interaction device 4 may comprise all kinds of combinations of passive details 5 and active details 6. In such interactive visual system 22, the cameras 9 are synchronized to each other, while the updating of the images from the projector 2 optionally can be synchronized, but normally not need to be synchronized for this interactive function. In case the interaction objects 4 are active, they are synchronized to the cameras 9, and the optional illuminant 3 may be synchronized to the cameras 9.

In FIG. 1 and for most of the other exemplary configurations described in the following, the hardware configuration includes an interactive visual system 22 comprising two or more units 1. However, in all cases the principle for synchronization between camera 9, optional illuminant 3, the updating of the images from the projector 2 and the unit-to-device synchronization between the camera 9 and the interaction objects 4 are the same even if there is only one single unit present or only one single unit 1 switched on.

Also the principles for unit-to-unit synchronization, will handle the situations where only one unit is present, or where only one unit is switched on, or occasions where one or several units are switched on and off in sequence, as well as occasions where there are two or several units which are switched on in the same room.

In the following we will refer to PJ1 and PJ2 (and a third PJ3) as interactive projectors.

Referring to FIGS. 2A-2H, the principle of synchronization in the present invention is illustrated for an exemplary configuration almost similar to FIG. 1, but where there are three instead of two units 1 being interactive projectors PJ1, PJ2 and PJ3. The same synchronization principle as illustrated may be applied for all other configurations of the present invention, like, for example, the exemplary configurations depicted in FIG. 18-24. The principle of synchronization will be described by how the projectors PJ1, PJ2 and PJ3 one by one are switched on and how they get synchronized to the projectors already running, namely based on the principles for this unit-to-unit synchronization.

Furthermore, an exemplary configuration according to the present invention will, in the following, consider wireless NIR (or IR) receiver and wireless NIR (or IR) transmitter for the synchronization system, while the same favorable properties can be described with a wireless RF transmitter and RF receivers adapted to send short RF bursts. Also electrically wired or optical wired solutions instead of wireless solutions as described above, can be utilized for the present synchronization principle.

By utilizing NIR (or IR) based receivers and transmitters for the proposed synchronization scheme, other use of NIR (or IR) such as in IR based remote controllers can be affected and be disturbed, if the burst duration is too long, or the bursts are too often. Therefore, in a preferred embodiment of the present invention, after 2 (or 3) short bursts there is a break of several similar time intervals without modulated NIR (or IR). In these time periods other NIR/IR based devices and systems may communicate without disruption, e.g. such that a person faultlessly can control the Projector itself or some other audio-visual equipment by their respective remote controllers.

While at least two consecutive short bursts are required for camera-to-pen synchronization (unit-to-device synchronization, to be more general), as described more in detail in FIG. 11-17 for interaction objects/devices, the $3^{rd}$ short burst is reserved for the camera-to-camera synchronization (unit-to-unit synchronization, to be general) of all the Interactive Projectors (units) in a room. The two synchronization mechanisms are required to ensure that all the units in the room are synchronized, and to ensure that simple devices (like pens and other interaction objects, 3D shutter glasses etc) are synchronized to the synchronized units. In the special case of Interactive Projectors and Pens, all the Cameras and optionally the projectors embedded in the Interactive Projectors in a room are synchronized such that they send out their short bursts at the same time instances, and all Pens in the room are synchronized based on these burst, namely that the Pens are flashing their IR-LEDs based on the timing of these short bursts, and can be detected by the cameras as described more in detail related to FIG. 11-17 below.

The principle proposed for the unit-to-unit synchronization is denoted the Listen and Repeat principle, and is considered favorable compared to the well-known Master-Slave principle. According to this inventive step of the present invention, the Listen and Repeat principle includes an implicit "repeater" function ensuring that each interactive projector (or generally, each unit) contributes to the further distribution of the short synchronization bursts in the room, as soon as the unit is synchronized itself. This feature helps to increase and broadcast the burst from one unit to another unit 1. Also, in contrary, if there is no synchronization bursts in the room, after some waiting time, the unit will start to send out short bursts to start the synchronization process.

The synchronization scheme can be illustrated as in the following: When the first unit 1, the interactive projector PJ1, is switched on and is entering receive mode, we first suppose there are no short synchronization bursts present in the room, see left part of FIG. 2A. After PJ1 has been in receive mode for some while, and PJ1 has detected no short, repetitive bursts, then PJ1 will decide to start putting out two short bursts MA.1 and MA.2, and optionally, a short synchronization burst SA, see FIG. 2A. In general, a unit will output the two short bursts MA.1 and MA.2 and MB.1 and MB.2, and output a synchronization burst either in position SA or in SB, see FIGS. 2A-2B and FIG. 2G, respectively. After these 2 to 3 short bursts (MA.1, MA.2 and optionally SA), there will be a pause without any bursts from the projectors in this exemplary configuration, see FIG. 2B-2D, before the next 2 to 3 bursts (MB.1, MB.2 and optionally SB), and then another pause without any bursts from the projectors in this exemplary configuration, see FIG. 2B-2D, before the sequence is repeated again.

The primary purpose of MA.1 and MA.2, and MB.1 and MB.2, respectively, are for the unit-to-device synchronization, because an interaction device 4 is requiring at least to consecutive bursts of correct width and distance apart, to start it pen flashing sequence.

The primary purpose of burst SA and SB, respectively, are for the unit-to unit synchronization, and the averaged start time of these unit-to-unit synchronization bursts SA or SB, respectively, are used for each unit to define a very precise internal synchronization signal. Of course, also the occurrence of SA and SB bursts can be used for the unit-to-device synchronization, since they have the same principal width and distance to previous pulse as the unit-to-device synchronization bursts, but for the SA an SB there are no guarantee that they occur, so the unit-to-device synchronization should not depend on their presence.

In an exemplary scheme as depicted in FIG. 2F-2H there will be a typical sequence of 16 short burst periods B1-B16 which is repeated, such that after the sequence of B1-B16, the same B1-B16 is repeated again. Each synchronized unit will always output exactly five such short burst within the time of 16 burst periods, but the selection of whether to output its synchronization burst in the SA or in the SB "position", see FIG. 2F and FIG. 2G, respectively, is decided by a pseudo-random function.

As above, first suppose there are no short synchronization bursts present in the room, see left part of FIG. 2E. After PJ1 has been in receive mode for some while (See state S2—Silence test in FIG. 5) and PJ1 has detected no short, repetitive bursts, then PJ1 will enter the state S6—Master (see FIG. 5) and start putting out two short bursts MA.1 and MA.2, and optionally, a short synchronization burst SA, see FIG. 2E. In general, a unit will output the two short bursts MA.1 and MA.2 and MB.1 and MB.2, and output a synchronization burst either in position SA or in SB, see FIG. 2F and FIG. 2G, respectively. After these 2 to 3 short bursts (MA.1, MA.2 and optionally SA), there will in this case be a pause of typically 6 or optionally 5 short burst periods-without any bursts from the projectors in this exemplary configuration, see FIGS. 2F-2H, before the next 2 to 3 bursts (MB.1, MB.2 and optionally SB), and then another pause of typically 6 or optionally 5 short burst periods without any bursts from the projectors in this exemplary configuration, see FIGS. 2F-2H, before the sequence is repeated again.

Figure 5A:
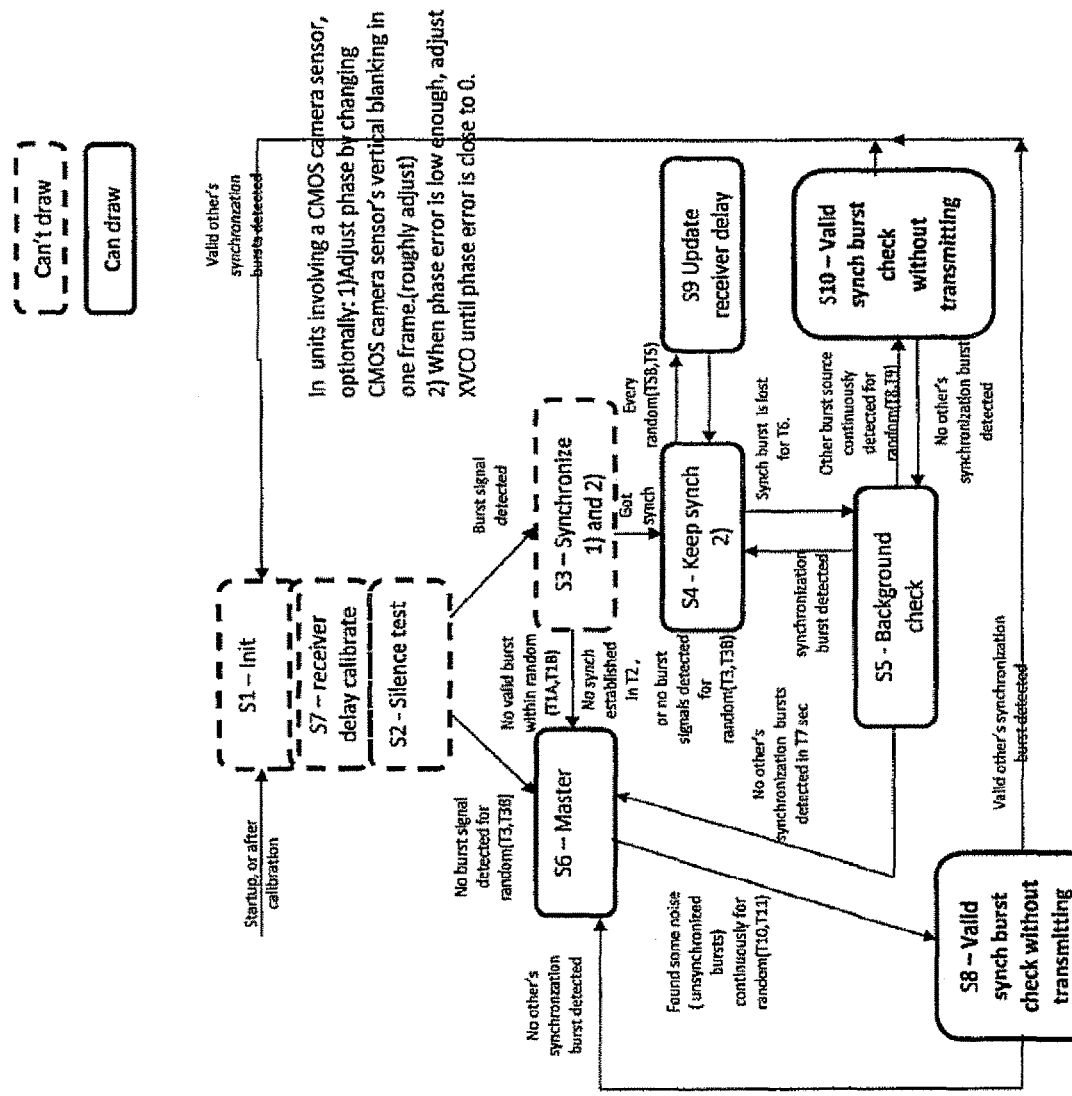
FIG. 5A is an illustration of an example of the synchronization algorithm for the listen and repeat with randomised delay synchronization principle of the present invention, and parameterized with symbolic time and timeout parameters T1-T11.

Further, since PJ1, when it was turned on, did not find any bursts at all, or since it during a testing period of either T1A or T1B, randomly selected, after entering state S3—Synchronize, did not find other short, repetitive bursts from another unit (namely the sequence MA.1, MA.2, optionally SA, MB.1, MB.2 or optionally SB), it is entering into a temporary "master" role, the state S6—Master, see flow diagram in FIG. 5A. Even in this temporary "master" mode, it will check within a time T10 or T11 (chosen randomly) if there are other burst which are not synchronized to itself, and PJ1 will then even switch off its own bursts to check in state S8—Valid burst check without transmitting for other units' bursts without disturbance from PJ1's own transmitted bursts. If other unit's valid bursts are detected, the PJ1 then will need to enter state S1—Init to start to likely synchronize to these valid bursts by the state S3—Synchronize in FIG. 5A.

In this case the PJ1 is in a temporary "master" mode, except that it will regularly check whether there are other units or some other burst noise in the room, it will not try to adapt or synchronize to other units. In the following we see that when a second unit is introduced, the second unit will adapt and synchronize to the existing signals from PJ1, and finally we describe a situation where all projectors PJ1,PJ2, PJ3 are adapted to and synchronized to each other, without any temporary "master", since the first PJ1 which was a temporary "master", was switched off and on again.

So assume, as above, that PJ1 is in the state S6—Master, and that another unit namely interactive projector PJ2 is turned on. PJ2 will enter the state S3—Synchronize and will soon go into state S4—Keep Synch as long as it detects synchronization bursts within a timeout of T6.

Figure 2B:
Figure 2C:
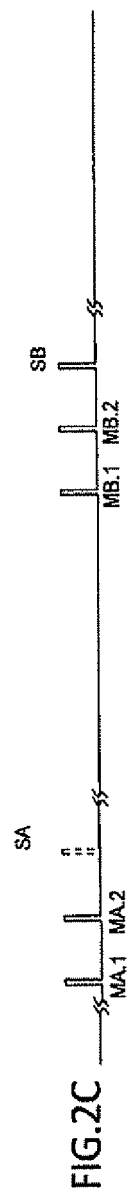
Figure 2D:

As long as a unit (1) like PJ2 is in state S4—Keep Synch it will transmit the MA.1, MA.2, optionally SA, MB.1, MB.2 and optionally SB, but the selection of whether to output its synchronization burst in the SA or in the SB "position", see FIG. 2B and FIG. 2C (or FIG. 2F and FIG. 2G), respectively, is selected by a pseudo-random function, and the unit will then always update its internal synchronization signal estimates based on the average of start time of the detected synchronization burst in the SA or SB "position" in the other "position" than the unit is transmitting its own synchronization burst, such that if the unit 1 is transmitting its synchronization burst in SA "position" it will detect and measure the starting time of the synchronization burst in SB "position", and vice versa. By this principle, denoted Listen and Repeat, the accuracy of the unit-to-unit synchronization is not disturbed by the unit's 1 own burst transmission.

Assume once again that PJ1 is in the S6—Master state, and PJ2 is in the state S4—Keep Synch and that a third unit 1 namely interactive projector PJ3 is turned on. PJ3 will enter the state S3 Synchronize and will soon go into state S4—Keep Synch as long as it detects synchronization bursts within a timeout of T6.

As long as a unit 1 like PJ3 is in state S4—Keep Synch it will transmit the MA.1, MA.2 optionally SA, MB.1, MB.2 or optionally SB, but the selection of whether to output its synchronization burst in the SA or in the SB "position", see FIG. 2B and FIG. 2C (or FIG. 2F and FIG. 2G), respectively, is as before selected by a pseudo-random function, and the unit will then always update its internal synchronization signal estimates based on the average of start time of the detected synchronization burst in the SA or SB "position" in the other "position" than the unit is transmitting its own synchronization burst, such that if the unit 1 is transmitting its synchronization burst in SA "position" it will detect and measure the starting time of the synchronization burst in SB "position", and vice versa. By this principle, denoted Listen and Repeat, the accuracy of the unit-to-unit synchronization is not disturbed by the unit's 1 own transmission, and the synchronization burst are distributed from one unit 1 to another unit 1 and the transmission time chosen by the another unit 1 is based on an average of the detected synchronization burst starting times where these starting times are not disturbed by the unit's 1 own burst transmissions.

The pseudo-random selection can be based on a pseudo-random generator like a simple linear feedback shift register and using the running image frame number as a seed.

Assume that the first unit 1, the PJ1, which was turned on, now is switched off and on again. In this case the PA will soon be synchronized to the PJ2 and PJ3 and will be in the state S4—Keep Synch, so none of the units 1 will now be a temporary "master" in this case.

All the units 1 are phase locked to the averaged starting time of other's short synchronization bursts.

Figure 4:
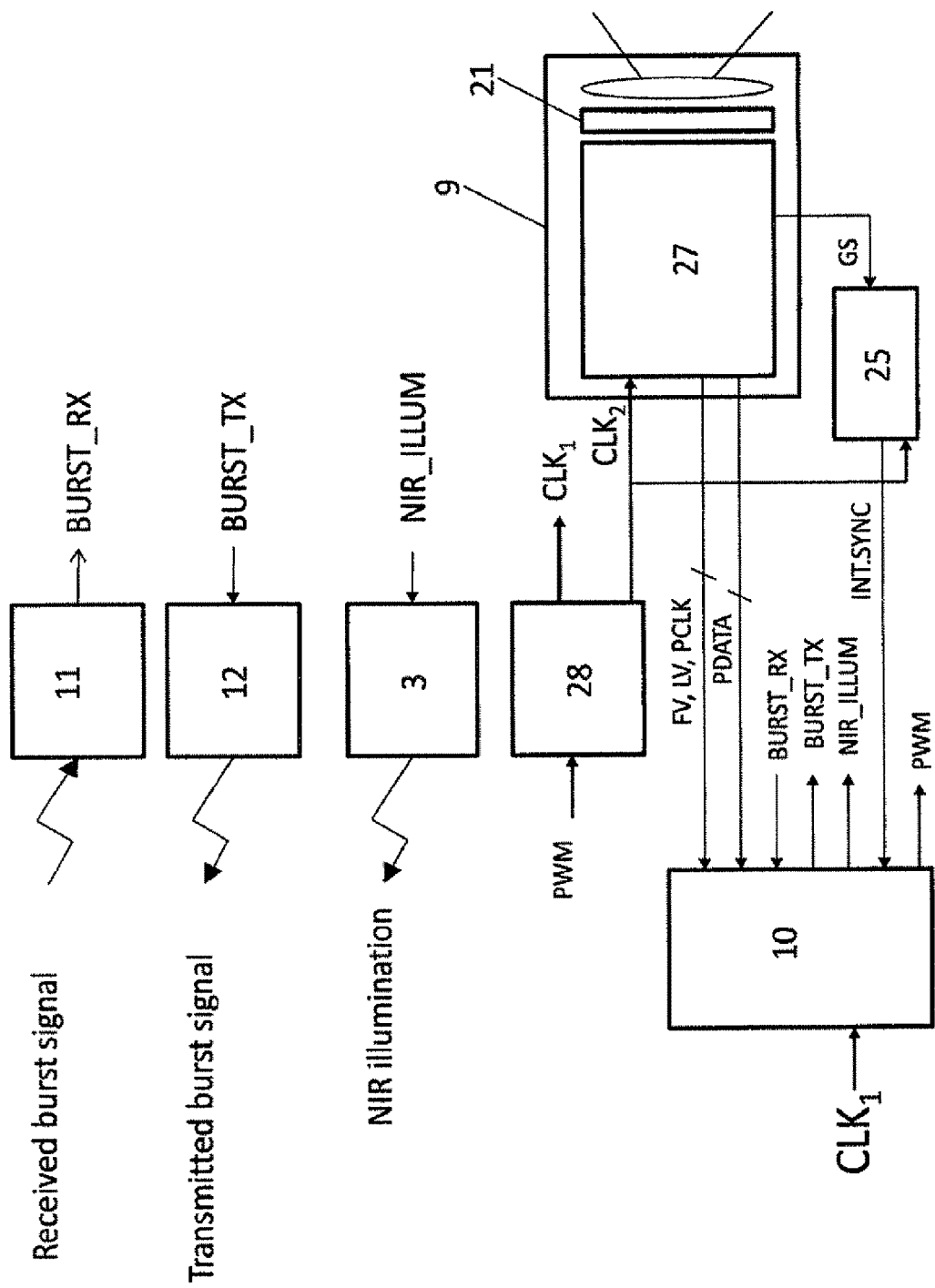
FIG. 4 is an illustration of an example of a synchronization circuit schematic for the listen and repeat with randomised delay synchronization principle of the present invention, also including the receiver signals and internal signals in synchronized unit (e.g. camera)

A preferred embodiment of the synchronization hardware suitable for a camera-based solution is shown in FIG. 4 comprising a receiver 11 with a receiving detect signal BURST_RX; a transmitter 12 with a burst transmit signal BURST_TX; an optional illuminant 3 for NIR illumination controlled by signal NIR_ILLUM; a camera 9 comprising a CMOS image sensor 27 clocked by a clock signal $CLK_2$ and outputting frame valid signal FV, line valid signal LV, pixel data PDATA, pixel clock PCLK, and an exposure timing signal GS (Global shutter); an optional timing generator 25 which based on the GS signal and clocked by the clock signal $CLK_2$ generates an internal synchronization signal INT.SYNC; computational and data collection means 10 which can capture the start time events of received burst signal and can make an average estimate and by the estimate can control the duty cycle of the pulse width modulation signal PWM such that the clock synthesizer 28 circuit produce a system clock $CLK_1$ and a derived camera clock $CLK_2$ resulting in a GS signal or a derived INT.SYNC signal with a frequency as equal as possible to the estimated burst frequency average.

Figure 6:
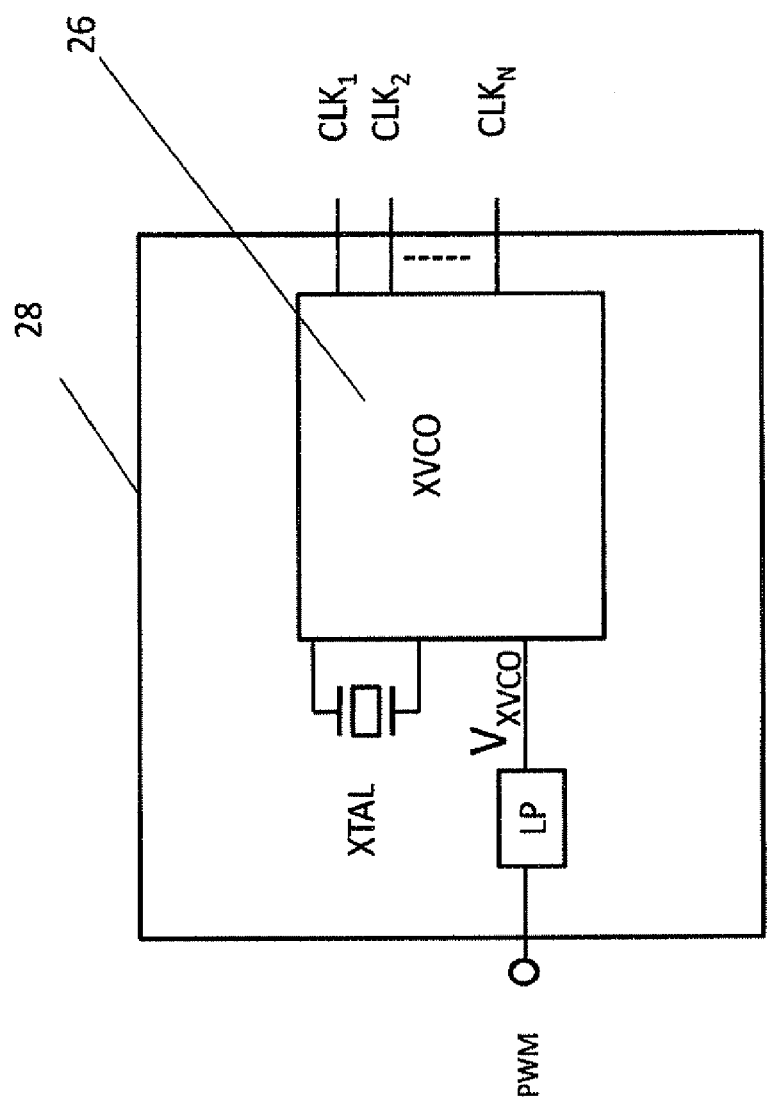
FIG. 6 is an illustration of an example of the crystal based clock synthesizer with pulse-width modulation input (PWM) to adjust the frequency as used in the synchronization circuit schematic of FIG. 4.
Figure 7:
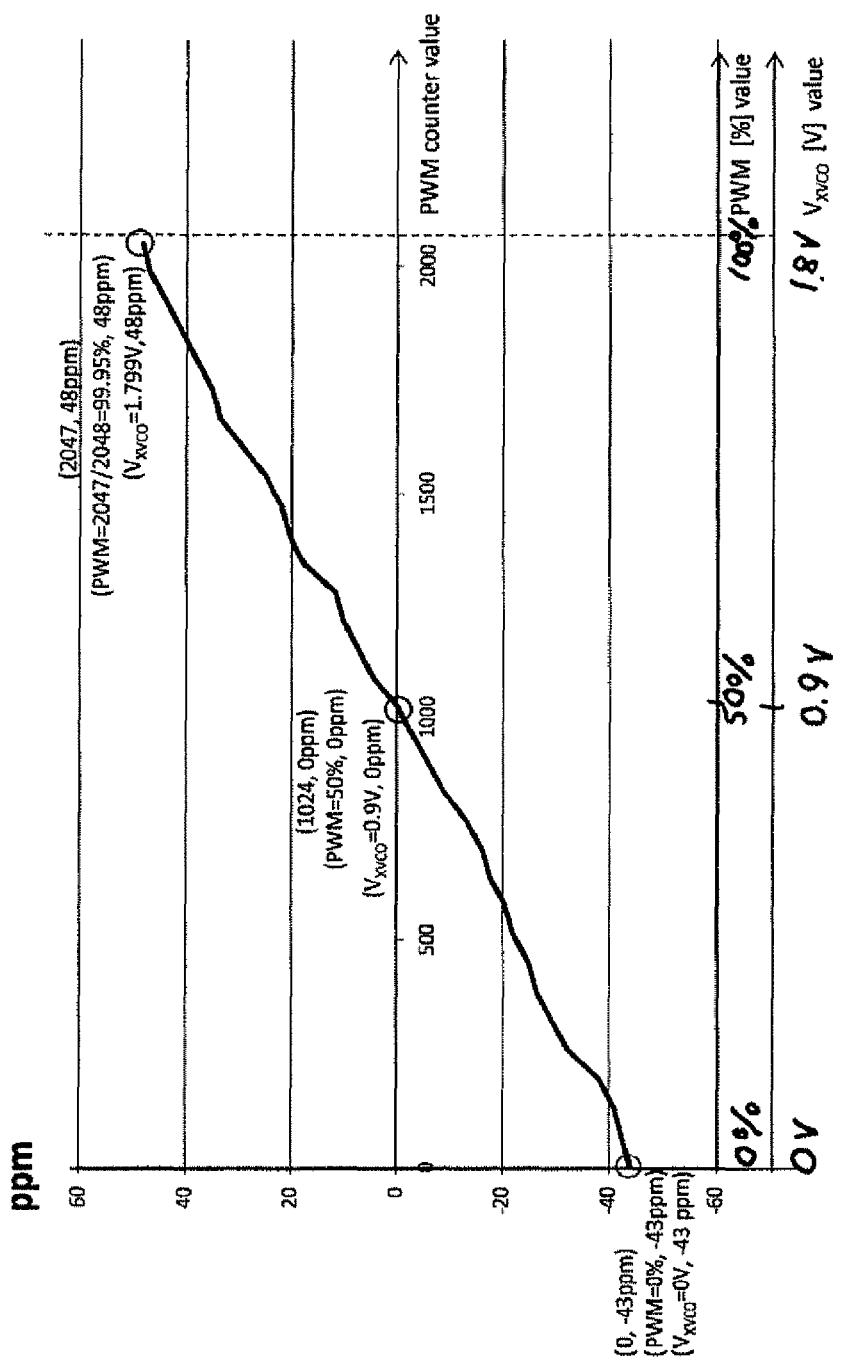
FIG. 7 is illustrating how the example of the crystal based clock synthesizer with pulse-width modulation input (PWM) can adjust the frequency (the deviation is given in ppm) as used in the synchronization circuit schematic of FIG. 4, where the frequency deviation, is shown as a function of the PWM signal's duty cycle.

In the preferred embodiment of the synchronization hardware, see FIG. 6, the pulse width modulated signal PWM is filtered by an low pass (LP) filter, e.g. a passive RC-filter, in the clock synthesizer block 28 to produce the $V_{XVCO}$ voltage signal which is connected to the voltage controlled crystal based clock synthesizer 26 which can adjust the output clock frequency for the clocks $CLK_1$ to $CLK_N$ by ±M (ppm) where M typically is in the range ±20 to ±150, dependent on the pulling range properties of the selected crystal XTAL. In FIG. 7 the achieved pulling range for a possible crystal is ranging from −43 ppm to +48 ppm when controlled by the PWM signal of duty cycle ranging from 0.0% to 99.95%, using a PWM counter ranging from 0 to 2047/2048, corresponding to a low pass filtered voltage $V_{XVCO}$ ranging from 0V to 1.799V.

Since all the units 1 are phase locked to the averaged starting time of other's short synchronization bursts, and the units 1 will all the time adjust their timing and phase to keep up the synchronization, based on their average estimation of the starting time of the other units 1 synchronization bursts, there is a risk that such system may drift in a direction due to some parameter asymmetry or disturbances. To make the resulting system stable, the adjustment of frequency in each unit will regularly be directed towards its center frequency by a fixed amount by a proposed strategy denoted the gravity function. Also another proposed strategy has been applied and denoted the spring function, where the adjustment directed towards its center frequency will be stronger if the deviation from center frequency is larger. Such stabilizing functions, like either the gravity function or the spring function, are in some example configurations active in the state S4—Keep Synch to facilitate that the system where no units are in state S6—Master will tend to keep the synchronized frequency close to the typical center frequencies of the units.

Figure 8:
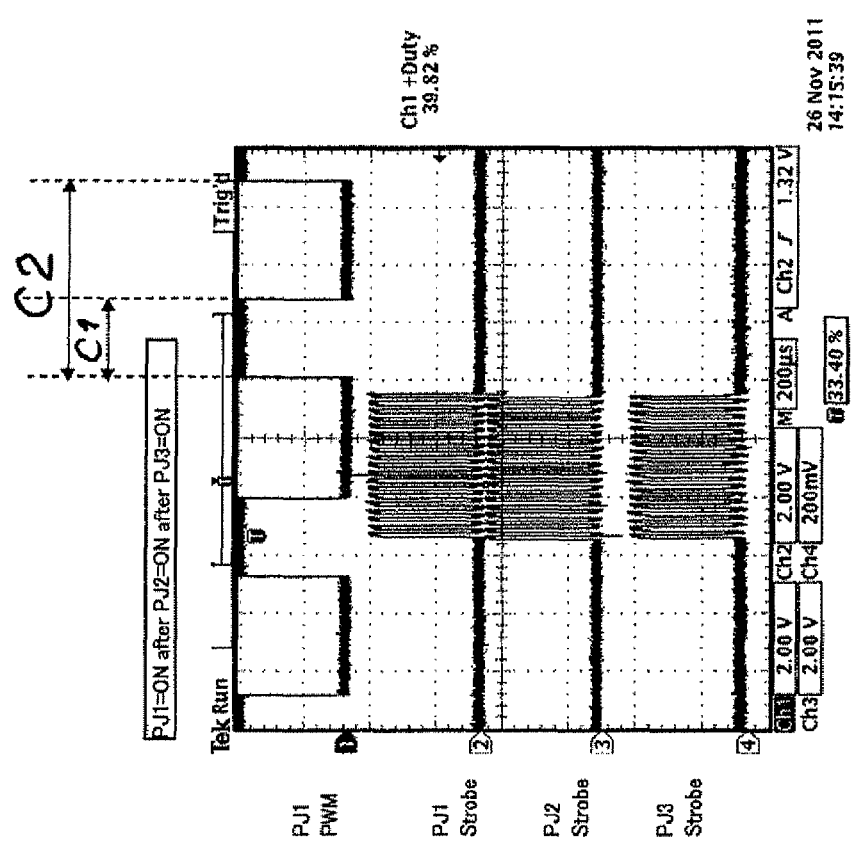
FIG. 8 is illustrating by a oscilloscope plot, three projectors PJ3, PJ2 and PJ1 which are synchronized one by one, where the pulse-width modulation input (PWM) of PJ1 is included in the plot, and in this example the current PWM value of PJ1 has become 39.82% corresponding to a duty-cycle C1/C2 of 815/2048.

In the case where there is no temporary "master" i.e. when the units are switched off and on one or several times, the adjusted clock frequency can drift if no such gravity or spring function as described above are applied. In FIG. 8 where three units 1 are synchronized, as can be seen by their aligned burst signals denoted PJ1 Strobe, PJ2 Strobe and PJ3 strobe, but the PJ1's frequency adjusting signal PJ1 PWM duty cycle C1/C2, at the instant this was captured, was below 40% (namely 39.82%), while closely around 50% would have been the expectation, if no drifting had occurred and the units and system were ideal. Typically, there will be signal noise, code implementation inaccuracies and different component tolerances, which will induce asymmetric and random behaviour which may force the units to start to drift in some direction, like e.g. shown in FIG. 8.

Figure 9:
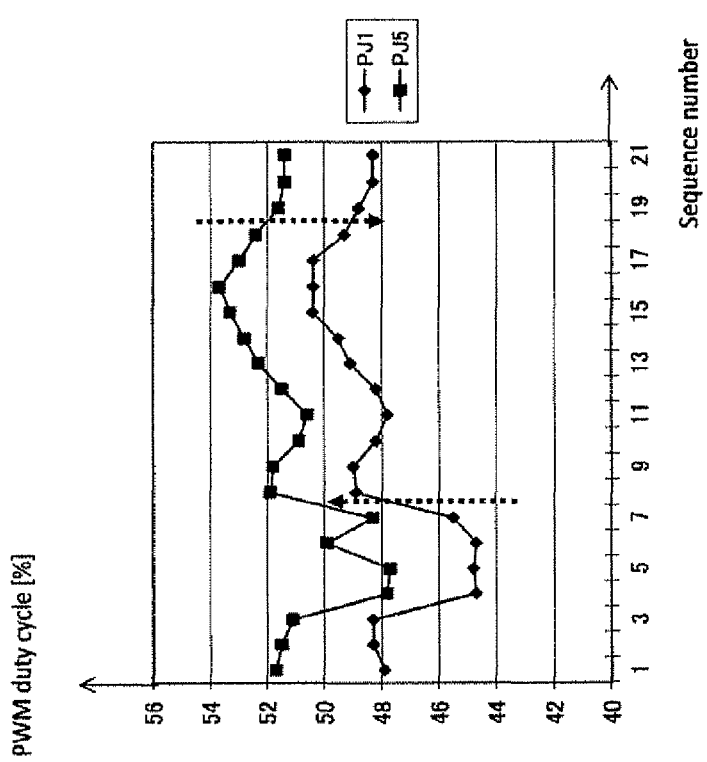
FIG. 9 is illustrating by a series of experiments how the gravity function helps to avoid that XVCO is shifted more and more for each time a new unit is switched off and on again, since the gravity function will slightly shift it towards its center value.

In FIG. 9 the effect of the gravity function is illustrated by experiments, where two units 1, PJ1 and PJ5, repeatedly are turned off and on as the table illustrates, and as the frequency is drifting downwards by PJ1 when the PJ5 is turned off and on, the PJ5 pulls it upwards when PJ1 is turned off and on.

Figure 10:
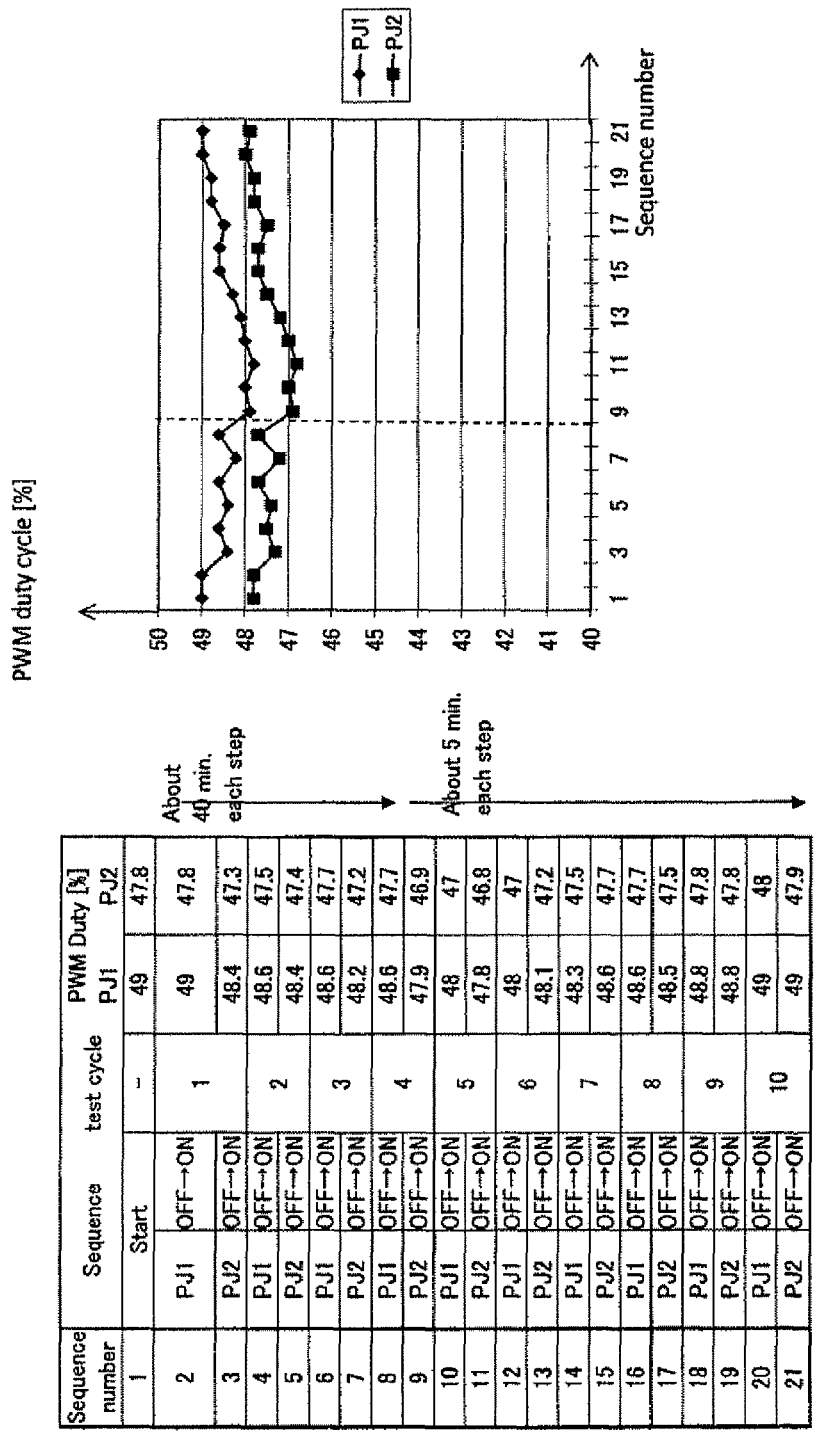
FIG. 10 is illustrating by a series of experiments how the spring function helps to avoid that XVCO is shifted more and more in one direction for each time a new unit is switched off and on again, since the spring function will slightly shift it towards its center value; and shift it with larger steps if there is a large deviation from center value.
Figure 11:
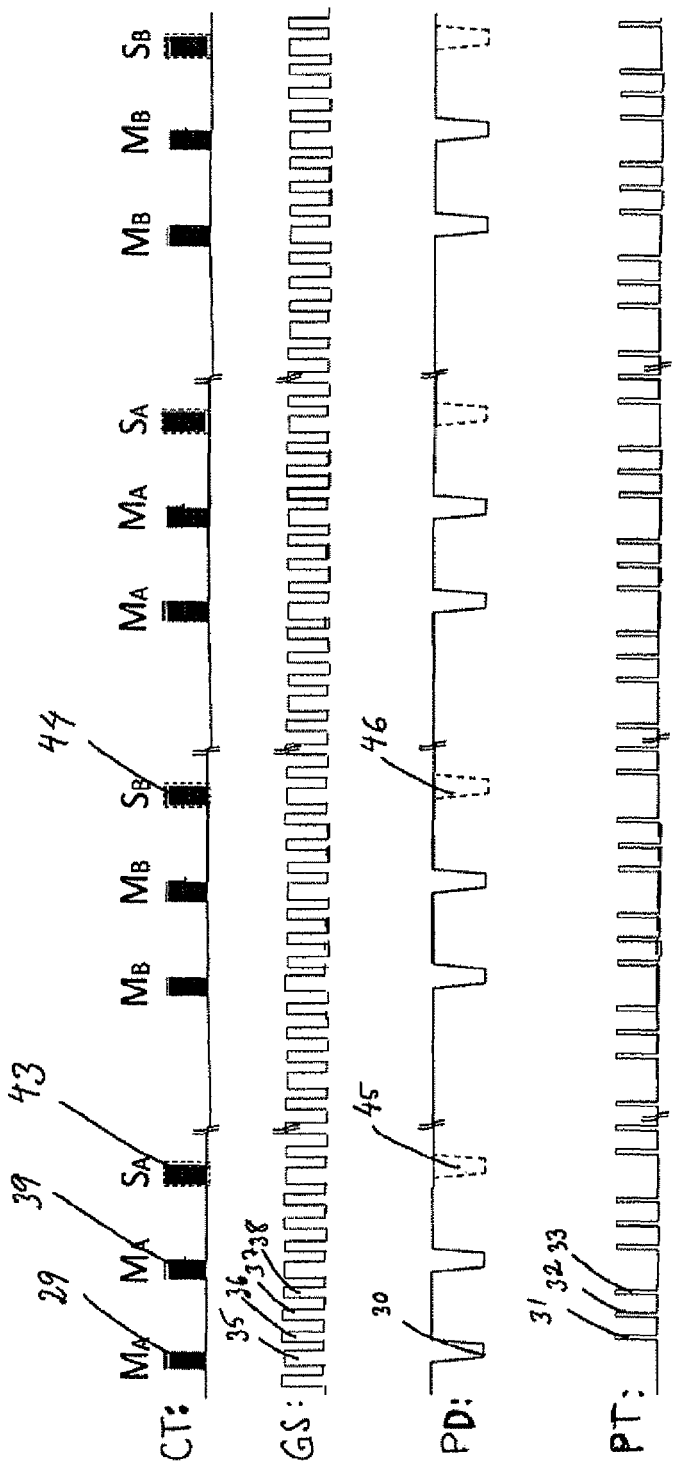
FIG. 11 is an illustration of the listen and repeat with randomised delay synchronization principle of the present invention, where the unit is a camera synchronized to an interaction object.

In FIG. 10 the effect of the spring function is illustrated by experimental results, where two units 1, PJ1 and PJ2, repeatedly are turned off and on as the table illustrates, and the frequencies are very stable although there is no "master" in the system, as illustrated for long time intervals of 40 minutes in test cycle 1-4 sequence number 1-8) and for shorter time intervals of 5 minutes for test cycle 4-10 (sequence number 9-21).

In a preferred embodiment, the phase difference between the internal synchronization signal derived from the camera GS by the timing generator 25 signal and the estimated burst synchronization signal should be 0. This can be done by changing the clock frequency as described above, but (initially) large phase differences can be reduced by programming the camera by its programming bus to change the vertical blanking period in one or more frames until the phase difference is small enough to start adjusting the clock frequency by the PWM (and $V_{XVCO}$) signal, see FIG. 5A where 1) vertical blanking time programming is used to "roughly adjust" the phase in the state S3—Synchronize and 2) PWM duty cycle control is used for the further finer adjustment, related to the state S3—Synchronize and the state S4—Keep synch.

Figure 3:
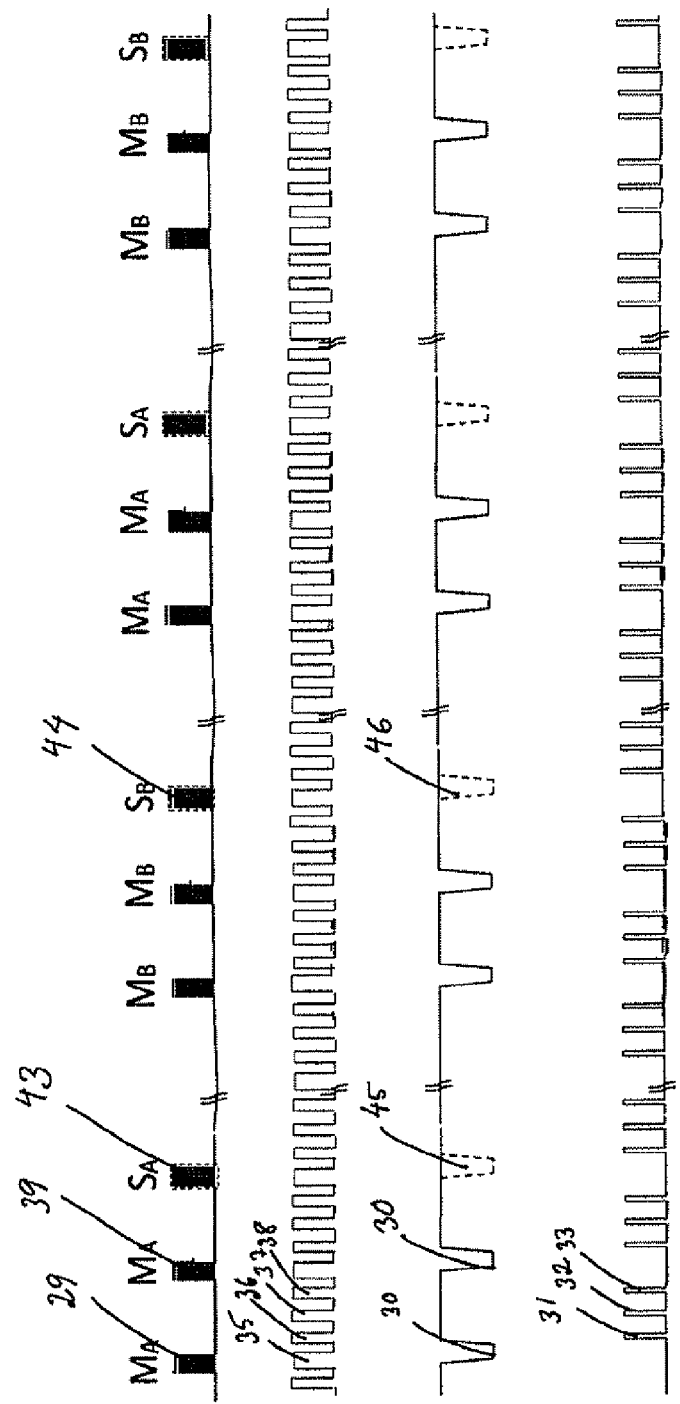
FIG. 3 is an illustration of the listen and repeat with randomised delay synchronization principle of the present invention, also including the receiver signals and internal signals in synchronized unit (e.g. camera, projector, display) and in synchronized associated device (e.g. interaction object, 3D shutter)

According to a preferred embodiment of the present invention, the Listen and Repeat principle enables several units 1 to be synchronized as soon as they are switched on and have received enough bursts in the state S3—Synchronize to estimate and adjust the clock frequency and internal synchronization signal as explained above, and there is no requirement for manual or semi-automatic configuration for defining master-slave roles etc.: units can be automatically synchronized when they are introduced, it is just "plug & play". But also simple peripheral devices can be synchronized like illustrated in FIG. 3. The one or more units 1 are producing the MA bursts and SA or SB bursts as described above, and the BURST_RX signal in FIG. 4 will then have a (somewhat delayed) low level pulse 30 signal as in FIG. 3 at the detection of MA burst 29 and a low level pulse 45 if one of the units 1 actually (by their pseudo-random function) output a synchronization burst 43 in the $S_A$ "position", and/or a low level pulse 46 if one of the units 1 actually (by their pseudo-random function) output a synchronization burst 44 in the $S_B$ "position". In the unit there can be different local synchronization signals as illustrated by the sequence of signal events 35, 36, 37 and 38, like e.g. the GS (global shutter) signal of the camera to synchronize internal processes and exposing. In some preferred embodiments of the present invention, simple peripheral devices as in FIG. 14 will comprise a receiver 20 in FIG. 14, or receiver 11 in FIG. 18, which can detect the MA, MB, SA and SB bursts like 29, 39, 43 and/or 44 (see FIG. 11) as low level pulses 30 and/or 45 and/or 46 of the receiver's output PD signal such that the peripheral device can synthesize own internal synchronization signal phases 31, 32, 33 adapted to control different functions e.g., like flashing of IRED 6 in interaction devices see FIG. 14, and e.g., to control the left/right shutter 23 change in wearable 3D shutter glasses in FIG. 18, respectively.

One advantage of the innovative Listen and Repeat principle implies that the short bursts for the units' 1 synchronization are spread over the room by the units themselves.

Furthermore the principle has the advantage that there is no need for defining which unit is the master and which are the slaves.

Figure 12:
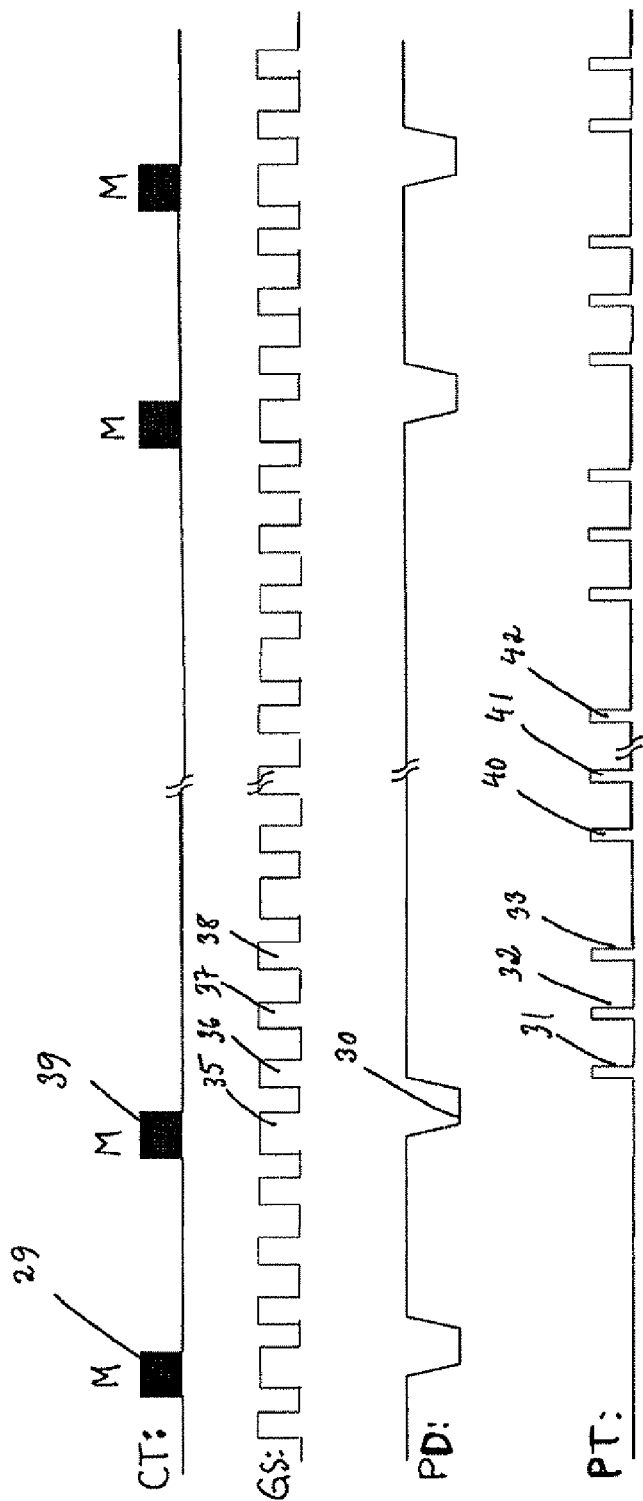
FIG. 12 is illustrating how a camera unit and an active interaction object can be synchronized by means of two consecutive bursts, such that the global shutter exposure control GS events in the camera and the sequence of NIR pulses are aligned in time.

With reference to FIG. 12, a preferred embodiment of the present invention is described where one or more units 1, in this case at least interactive projector PJ1, is transmitting the burst signal 29 and 39 by using near infrared transmission.

The Interactive Projector PJ1 sends out at least two short bursts, see signal CT in FIG. 12, in this case a modulated pulse train (M) in the near infrared (NIR) wavelength range, synchronized to camera's exposure control, namely the shutter width GS. These two short bursts 29 and 39 are recognized due to their typical burst width and their typical repetition interval (time between 29 and 39) by an interaction object 4, in this case referred to as a pen, and the interaction object 4 will output one or more of its non-modulating NIR pulses 31, 32, and 33 by its infrared light emitting diode IRED 6 at the right timing referred to the camera's exposure control, such that each NIR pulse are within the camera's shutter width 36, 37 and 38, respectively. This synchronization of the pen's NIR pulses enabling optimal camera exposure of each transmitted NIR pulse, to suppress noise from other NIR and IR sources by making the camera's shutter width, defining the exposure integration time, just slightly larger than the expected NIR pulse.

Consequently, since this synchronization implies good exposure timing control with a shutter width adapted to the NIR pulse length, only increased with a small margin to allow for crystal frequency drift and synchronization jitter, the achieved signal-to-noise ratio will be near optimum, if we define optimum as the case where the NIR pulse and shutter window are exactly overlapping. A higher signal-to-noise ratio implies that it is possible to reduce the outputted NIR LED intensity and thus reduce pen's power consumption thus increasing pen's battery lifetime.

Existing solutions without synchronization, cannot schedule a pen's NIR emitted pulse to a camera's exposure shutter. If the exposure shutter is too long, smearing due to the pen's movements may occur, which will reduce the captured image quality, thus limiting the image signal processing and image feature extraction and reducing the tracking performance and speed. Such existing solutions without synchronization will require that the pen needs to output NIR signal continuously to be detected by the camera, and moreover that the camera's shutter width has to be limited to avoid the smearing. Such system will inevitably require more power consumption in the pen, due to the continuous NIR emission required to be detected.

Figure 13:
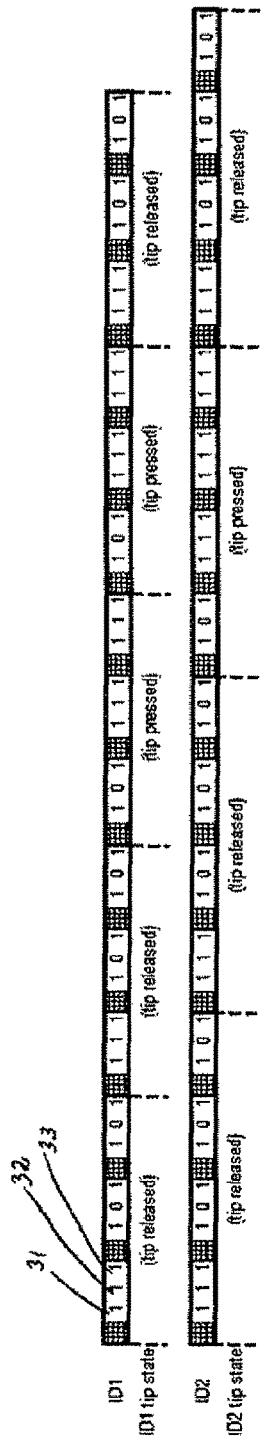
FIG. 13 is illustrating the interaction object's pulse sequence for signaling its identification (ID1 versus ID2) and tip switch state (pressed versus released)

In an exemplary configuration of the proposed system, the pen may transmit NIR pulses of 160 µs length within a 320 µs shutter window, with typically 2-3 pulses (average about 2.5) required per pen coordinate update of 26.6 Hz, due to the signaling of pen tip state and pen identification, see FIG. 13. To obtain the same signal to noise ratio, a pen which is continuously emitting needs an instantaneous power of $Y*160 \mu s/320 \mu s=0.5*Y$, if Y is the instantaneous power in the pulses of the proposed system. The reduction of the average power consumption due to the NIR emission for the proposed synchronized pen compared to the average power consumption of an unsynchronized pen will in this exemplary configuration be 2.1% ($Y*2.5*160 \mu s*26.6/(0.5*Y*1000000 \mu s \approx 2.1\%$), if the same signal-to-noise condition is required.

Furthermore, in contrary to the proposed system, such NIR emitting pen without synchronization, cannot signal its identity and/or tip switch state information to be detected by a camera while at the same time be continuously tracked by the camera.

In FIG. 13 the pen signaling, according to a preferred embodiment of the present invention, is including identification (ID1, ID2) and tip state (tip pressed, tip released) according to the simple flashing sequences of the pen in some consecutive pen phases, namely phase1, phase 2 and phase 3, denoted by 31, 32, 33, respectively in the topmost figure. The flashing sequence of the pen starts after receiving two short bursts 29 and 39 of a typical width and time interval as explained above for the FIG. 12. Even if there are no further short bursts from the unit for some time (for example for the next 0.3 sec or more), the pen will continue to output new flashing sequences like 40, 41 and 42, with the same internal timing relationship as 31, 32, 33, with almost the same time interval between the flashing sequence as the time interval between the short bursts 29 and 39, and such, due to the accurate internal crystal based timing estimates in the pen, each flashing pulse in these flashing sequences will be positioned within the global shutter (GS) integration time, such that the pen's pulse events will be captured very precisely by the camera frames, even after 0.3 seconds or more after the last synchronizing burst 29 and 39 were received. The sequence of captured camera frames is analyzed and the camera which is including feature extraction means, can find the position of the pen's IRED 6 and also the flashing sequence of the pen's IRED 6. From analyzing the flashing sequence of the IRED 6, it is possible to identify the ID of the pen (ID1 versus ID2) and the tip state of the pen, namely "tip pressed" or "tip released".

Figure 15:
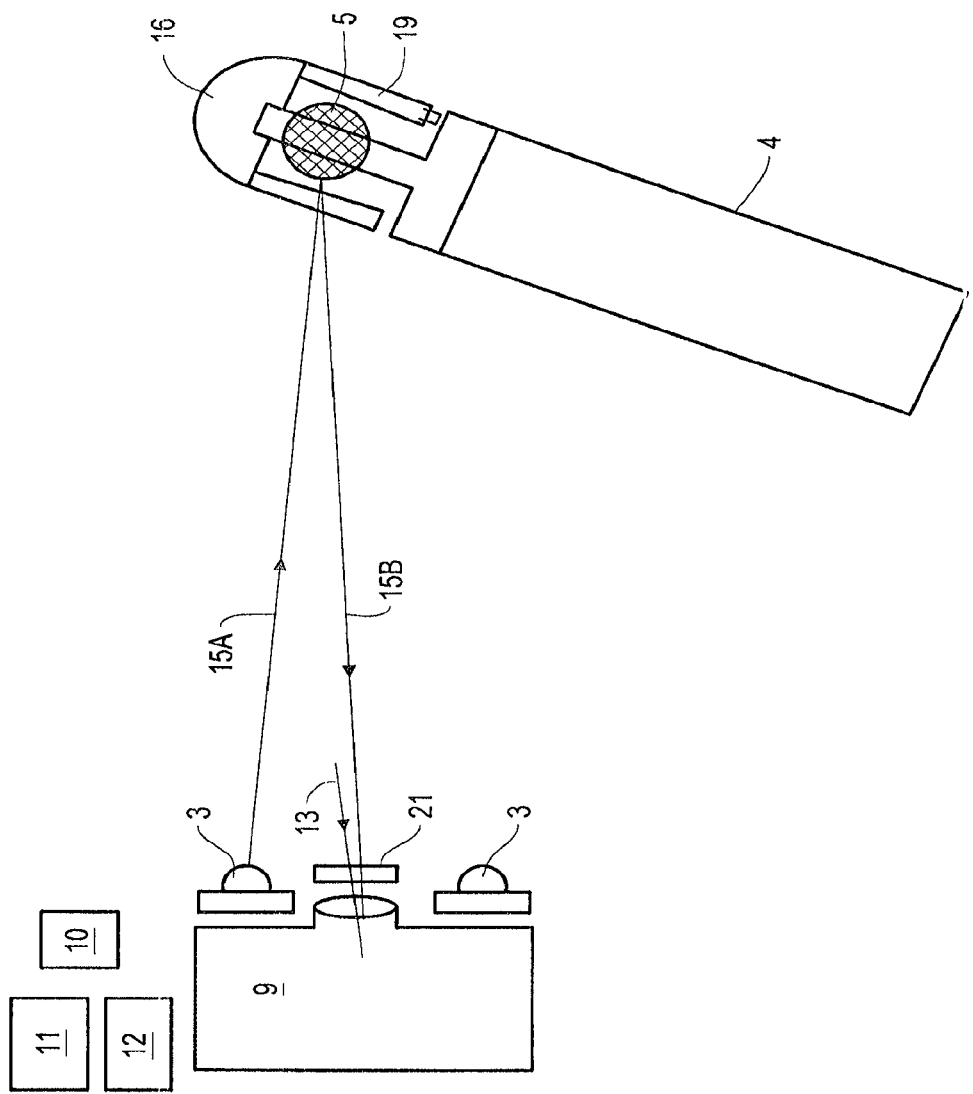
FIG. 15 is illustrating the principle and optical elements for utilizing retro-reflective optical details in the passive type interaction object.

At the top of FIG. 13 the typical flashing sequence of a IRED 6 of a pen with ID1 is shown, where each short sequence of four phases, starts with an initial phase (showed as hatched square (to the left of pen phase1 which is denoted 31) which is reserved for the optional flashing of the cameras illuminant 3 for detecting passive retro-reflective or reflecting details 5 of the pen, see FIG. 15. The next three phases are the three pen phases, namely phase1, phase2 and phase3, denoted by 31, 32, 33, respectively, at the top of FIG. 13. Three such short sequences are needed to signal that the pen is of identity ID1 and the current state of pen tip. The upper table in FIG. 13 describes for each short sequence 1, 2 and 3 of a ID1 sequence, how the pen will flash in the pen phases phase1, phase2 and phase3 in case the tip is "pressed" and in case the pen tip is "released".

Just below the top of FIG. 13 the typical flashing sequence of a IRED 6 of a pen with ID2 is shown, where each short sequence of four phases, starts with an initial phase (showed as hatched square (to the left of pen phase1 which is denoted 31) which is reserved for the optional flashing of the cameras illuminant 3 for detecting passive retro-reflective or reflecting details 6 of the pen, see FIG. 15. The next three phases are the three pen phases, namely phase1, phase2 and phase3, denoted by 31, 32, 33, respectively, at the top of FIG. 13. Four such short sequences are needed to signal that the pen is of identity ID2 and the current state of pen tip. The bottom table in FIG. 13 describes for each short sequence 1, 2, 3 and 4 of a ID2 sequence, how the pen will flash in the pen phases phase1, phase2 and phase3 in case the tip is "pressed" and in case the pen tip is "released".

Figure 14:
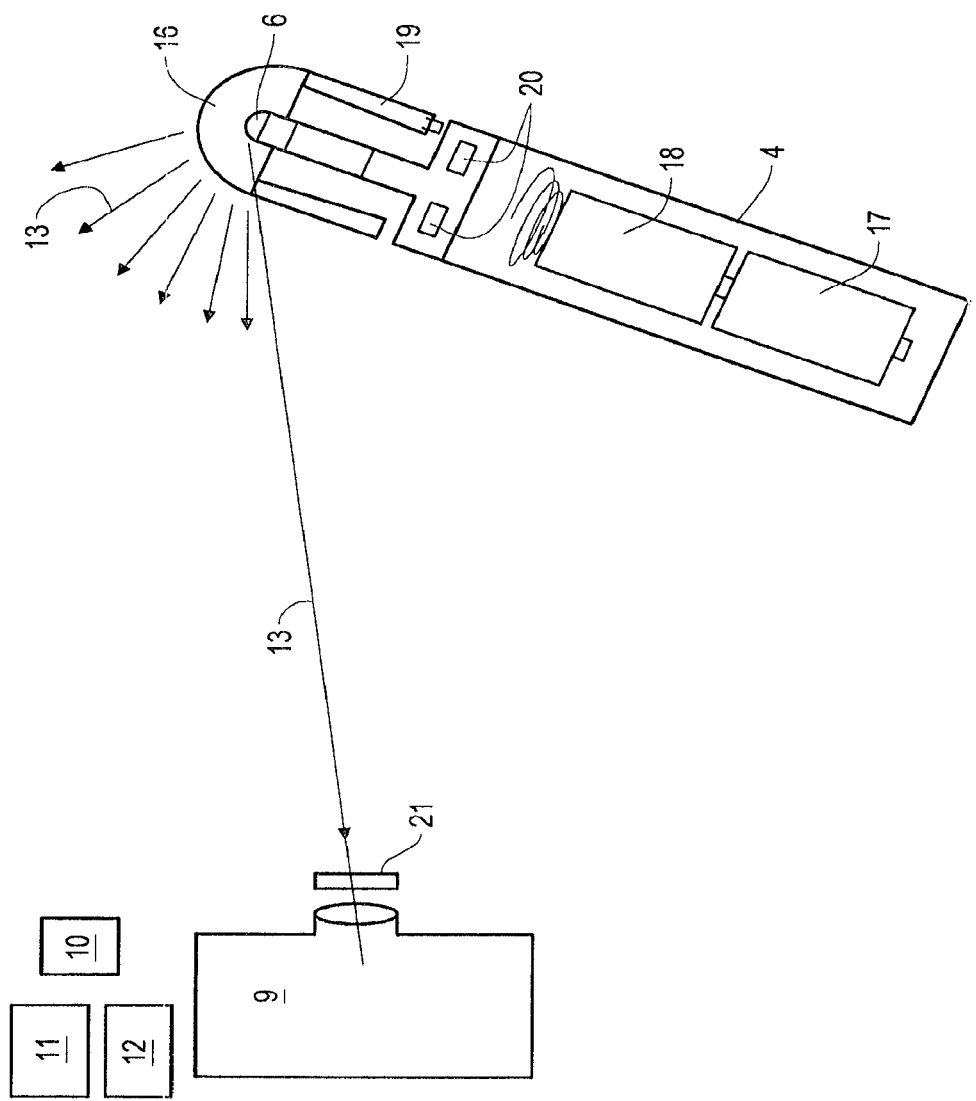
FIG. 14 is illustrating the principle and optical elements for the active type interaction objects pulse sequence for signalling its identification (ID1 versus ID2) and tip switch state (pressed versus released)

A preferred embodiment of the present invention is an interaction device 4 as shown in FIG. 14, which here is formed as a pen, comprising a tip 16, a wavelength dependent filter or coating 19, computational means 17 like a microcontroller, one or more receivers 20, one or more battery cells 18, a tip IRED 6 which is emitting NIR light in different directions or rays 13, where some of the rays will hit the camera 9 and may pass through an optional wavelength dependent filter 21.

Another preferred embodiment of the present invention is an interaction device 4 as shown in FIG. 15, which here is formed as a pen, comprising a tip 16, a wavelength dependent filter or coating 19, one or more retro-reflecting or reflective details 5, an illuminant 3, where the rays from the illuminant 15A is reflected back by 5 such that some rays 15B will hit the camera 9 and may pass through an optional wavelength dependent filter 21.

Figure 16:
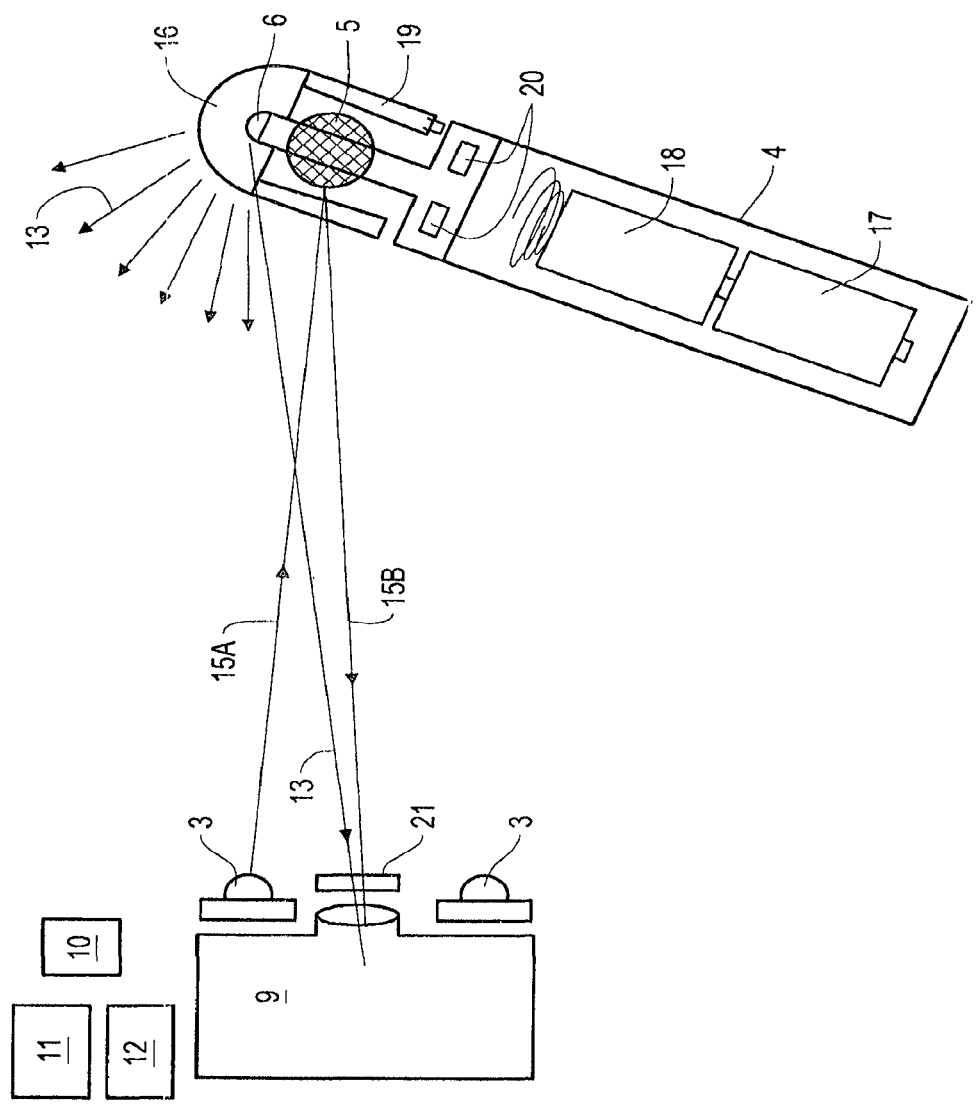
FIG. 16 is illustrating the principle and optical elements for the semi-passive type interaction object comprising pulse sequences for active signalling its identification (ID1 versus ID2) and tip switch state (pressed versus released) as well as for tracking, and reflective and/or retro-reflective optical details for tracking and identification and optionally for detecting tip switch state etc.

Another preferred embodiment of the present invention is an interaction device 4 as shown in FIG. 16, which here is formed as a pen, which combines the principles of FIG. 14 and FIG. 15. comprising a tip 16, a wavelength dependent filter or coating 19, one or more retro-reflecting or reflective details 5, an illuminant 3, where the rays from the illuminant 15A is reflected back by 5 such that some rays 15B will hit the camera 9 and may pass through an optional wavelength dependent filter 21, computational means 17 like a microcontroller, one or more receivers 20, one or more battery cells 18, a tip IRED 6 which is emitting NIR light in different directions or rays 13, where some of the rays will hit the camera 9 and may pass through an optional wavelength dependent filter 21.

Figure 17:
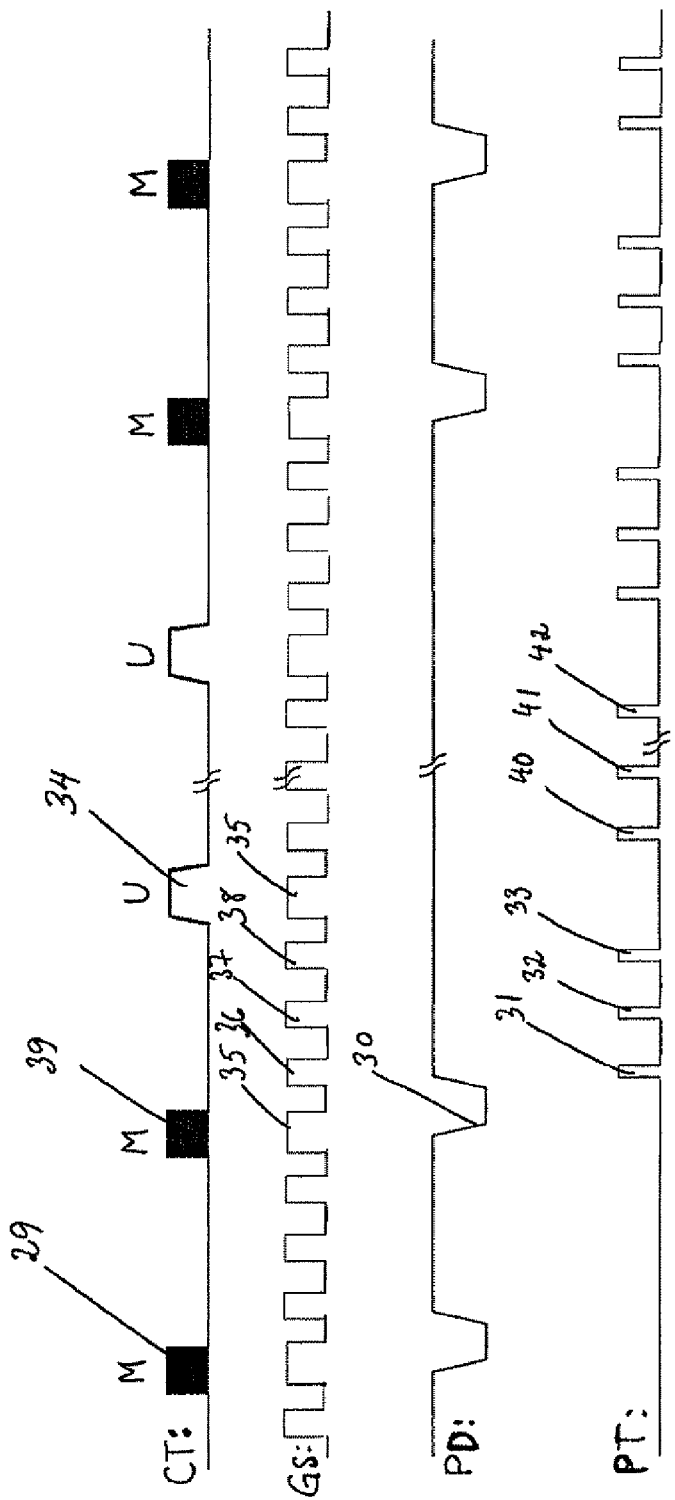
FIG. 17 is illustrating how a camera unit and an active interaction object can be synchronized by means of two consecutive bursts, such that the global shutter exposure control GS events in the camera and the sequence of NIR pulses are aligned in time, and also how illumination of the reflective and/or retro-reflective details can be performed by un-modulated pulses.

In FIG. 17 a preferred embodiment of the present invention is illustrated where each unit 1 is transmitting synchronizing (and optionally illuminating) bursts 29, 39 and the illuminant is transmitting un-modulated flashing pulses 34. The interaction device 4 may have retro-reflective or reflective details which are illuminated by the flashing pulse 34 and captured by the camera within the exposure shutter interval 35, while the active flashing IRED pulses are transmitted like 31, 32, 33 etc., and the camera is capturing within the respective exposure shutter intervals 36, 37, 38. The un-modulated flashing pulses 34 will not disturb the burst receivers.

Principles of operation of the visual system and the synchronization of its units have been described by referring to an exemplary hardware configuration as given by FIG. 1. In FIG. 18, FIG. 19, FIG. 20, FIG. 21, FIG. 22, FIG. 23 and FIG. 24 there are schematically illustrated other hardware configurations of a preferred embodiment.

Figure 18:
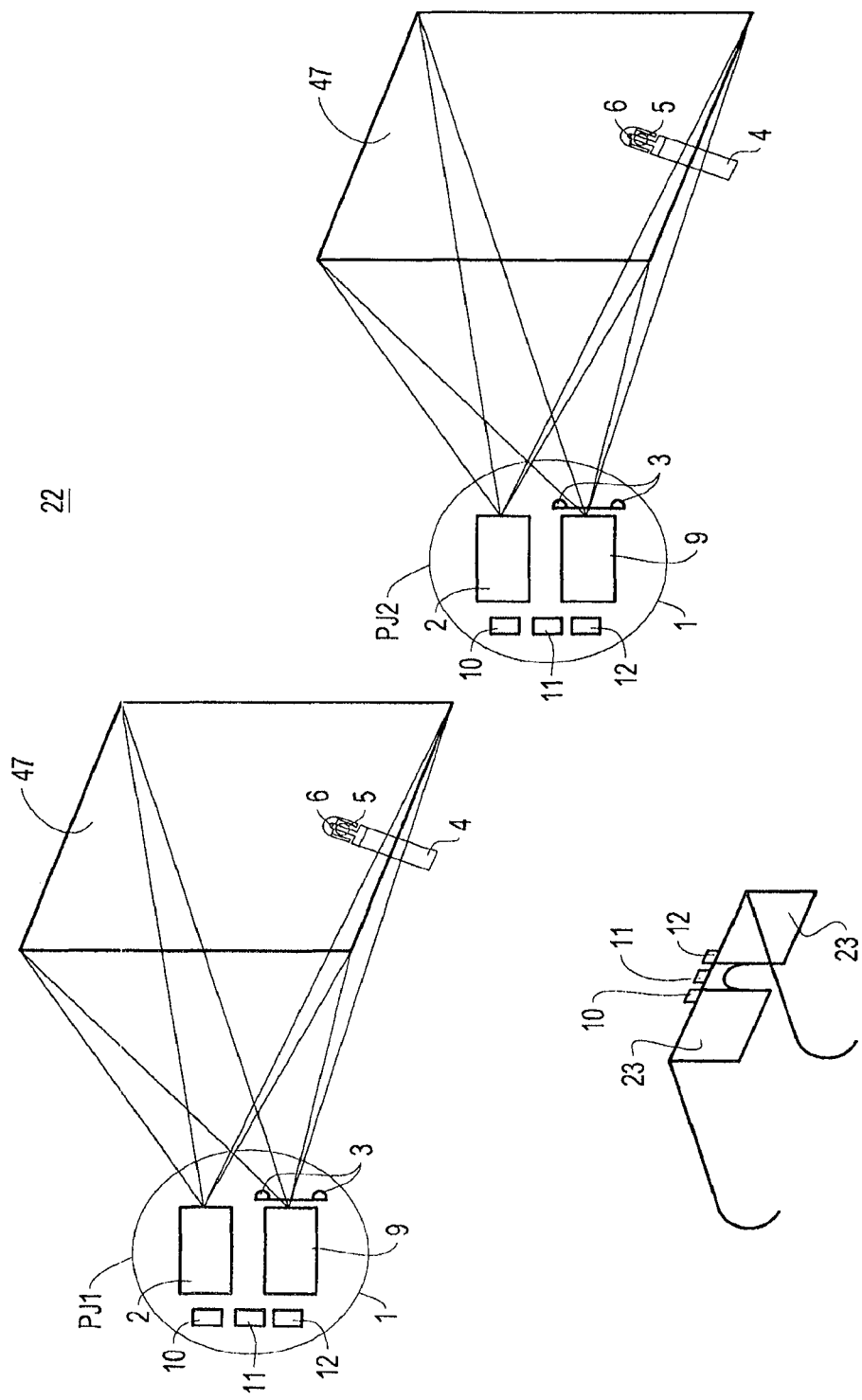
FIG. 18 is an illustration of an example configuration of the present invention, wherein the visual system is comprising two synchronized interactive projectors and a pair of 3D shutter glasses.

In FIG. 18 the hardware configuration includes an interactive visual system 22 comprising two units 1 as described in FIG. 1 and the updating of the images from the projectors 2 are synchronized, and also including a wearable 3D shutter glasses 23 controlled by a computational and data collection means 10 like a microcontroller or an application specific digital circuit and a wireless receiver 11, and optionally a wireless transmitter 12, such that the 3D shutter glasses can be synchronized to the update of the images.

Figure 19:
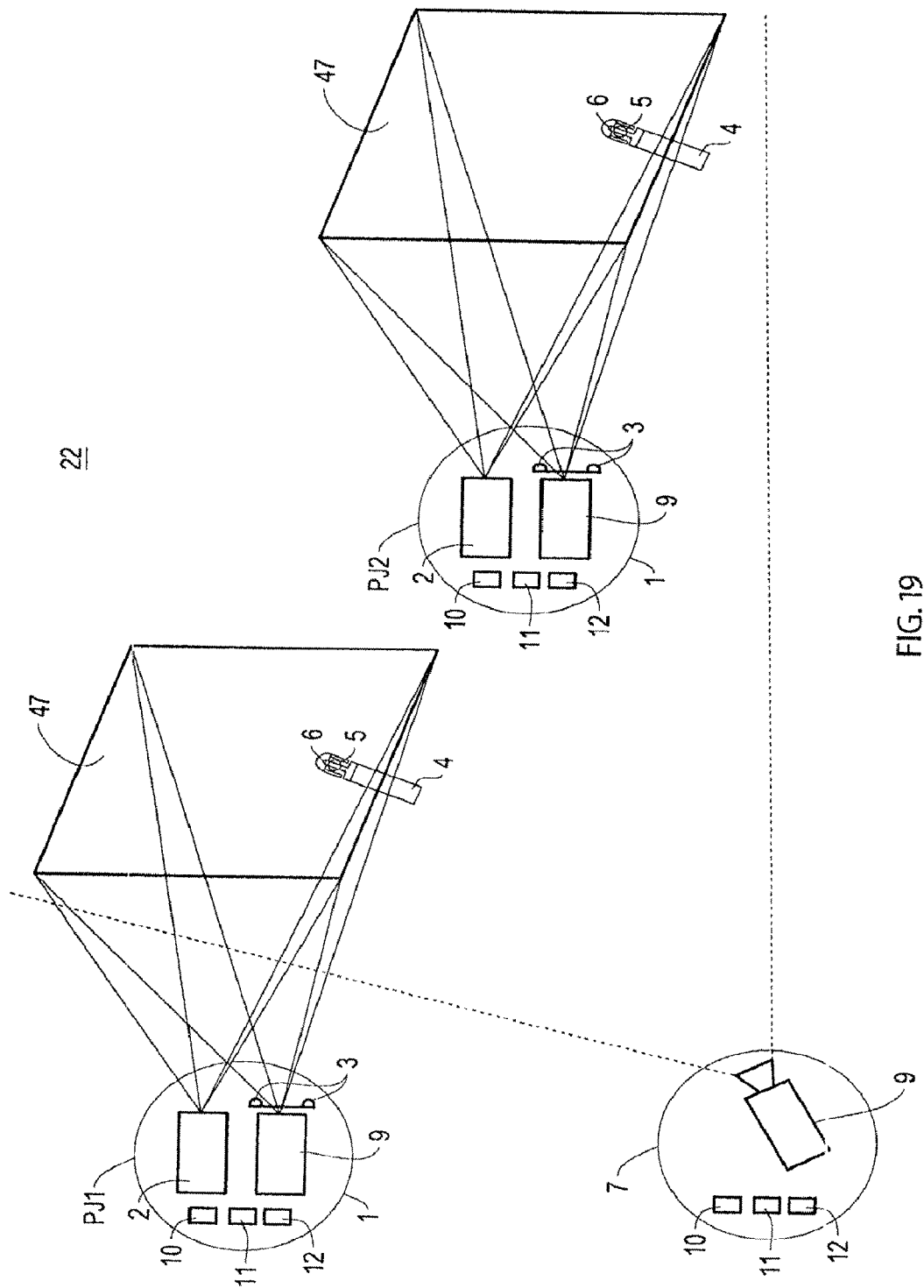
FIG. 19 is an illustration of an example configuration of the present invention, wherein the visual system is comprising two synchronized interactive projectors and a synchronized video camera.

In FIG. 19 the hardware configuration includes an interactive visual system 22 comprising three units 1, where two units 1 are as e.g. described in FIG. 1, and one unit 1 with a video camera 9 controlled by a computational and data collection means 10 like a microcontroller or an application specific digital circuit and a wireless receiver 11, and optionally a transmitter 12, such that the image capturing by the video camera 9 is synchronized to the updating of the images by the data projector 2, such that the video recordings may be flicker-free.

Figure 20:
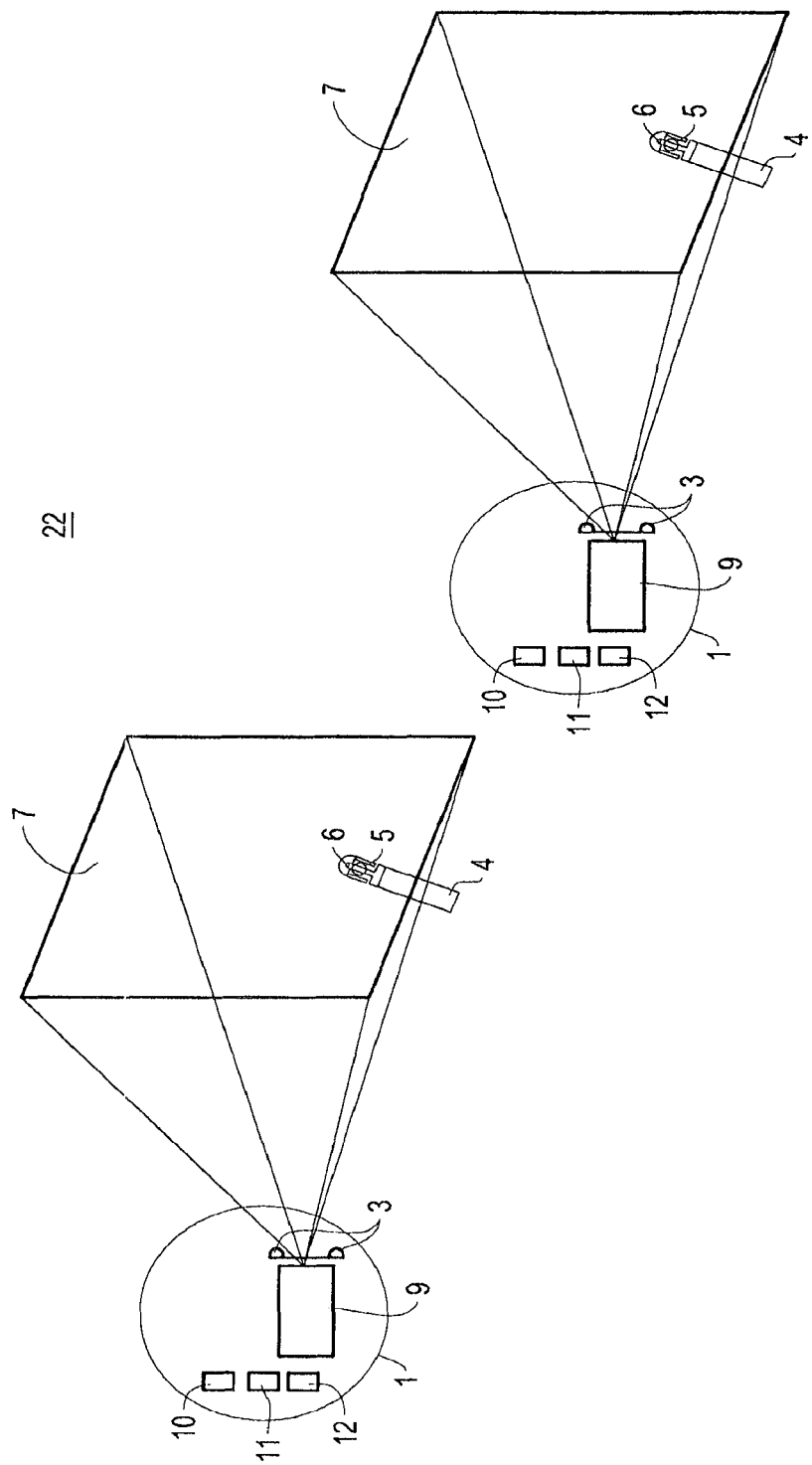
FIG. 20 is an illustration of an example configuration of the present invention, wherein the visual system is comprising two synchronized cameras which are capturing and tracking the interaction objects where the interaction surfaces are flat panel displays.

In FIG. 20 the hardware configuration includes an interactive visual system 22 comprising two units 1 which are camera based input devices, each comprising a camera 9 capturing the interaction surface and flat panel display surface 7 with an optional illuminant 3 illuminating the interaction surface and flat panel surface 7, a receiver 11, a transmitter 12, a computational and data collection means 10 like a microcontroller or an application specific digital circuit, and an interaction object 4. The interaction object 4 may comprise at least one passive optical detail 5 or one active optical detail 6, adapted to be detectable by the camera 9. The interaction device 4 may comprise all kind of combinations of passive details 5 and active details 6. In such interactive visual system 22, the cameras 9 are synchronized to each other, while the updating of the images by the two flat panel displays 7 are not synchronized to the cameras 9.

In case the interaction objects 4 are active, they are synchronized to the cameras 9, and the optional illuminant 3 may be synchronized to the cameras 9.

Figure 21:
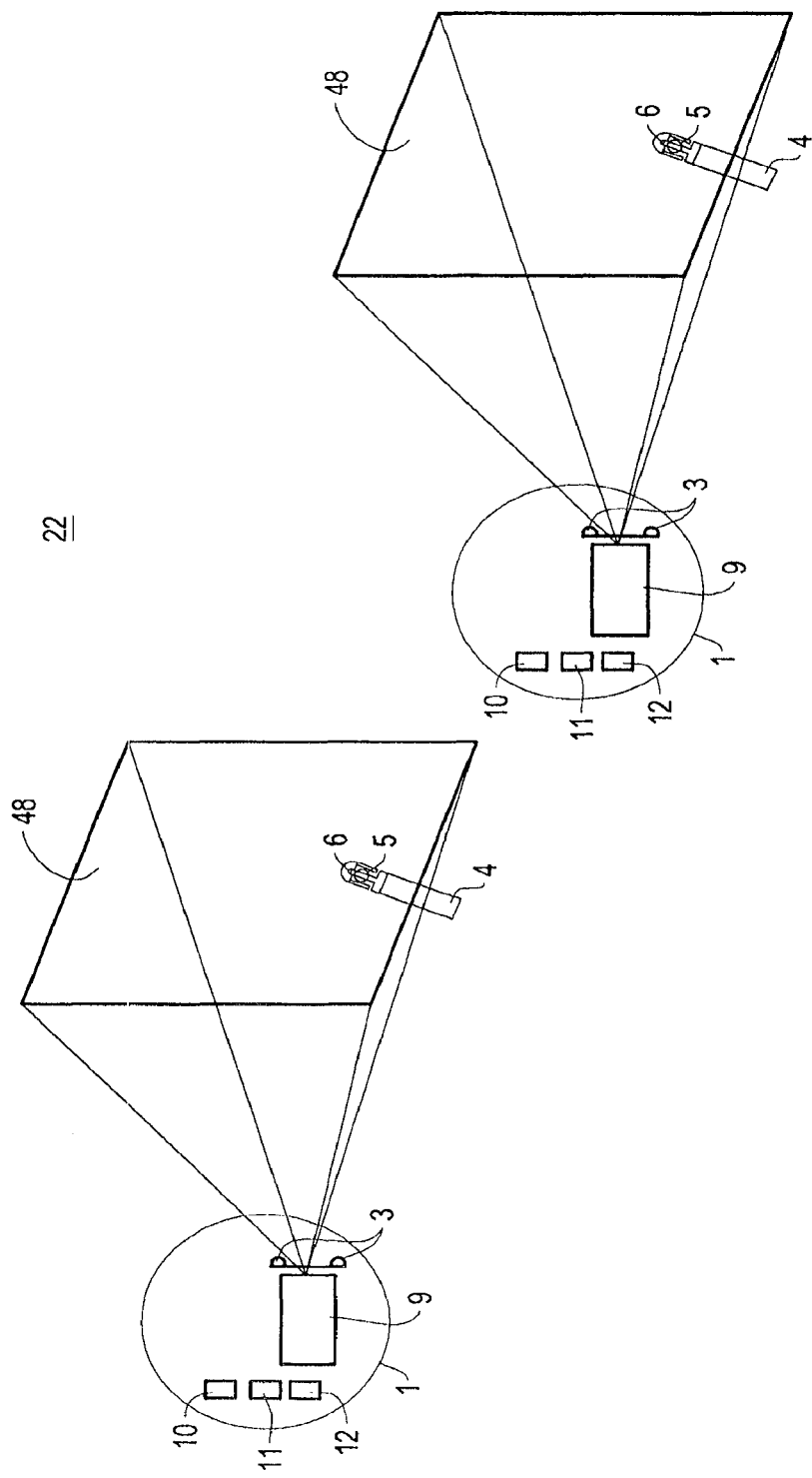
FIG. 21 is an illustration of an example configuration of the present invention, wherein the visual system is comprising two synchronized cameras which are directed towards an interaction surface, which are capturing and tracking the interaction object's position and state over the interaction surface.

In FIG. 21 the hardware configuration includes an interactive visual system 22 comprising two units 1 which are input devices each comprising a camera 9 capturing the interaction surface 48 with an optional illuminant 3 illuminating the interaction surface 48, a receiver 11, a transmitter 12, a computational and data collection means 10 like a microcontroller or an application specific digital circuit, and an interaction object 4. The interaction object 4 may comprise at least one passive optical detail 5 or one active optical detail 6, adapted to be detectable by the camera 9. The interaction device 4 may comprise all kind of combinations of passive details 5 and active details 6. In such interactive visual system 22, the cameras 9 are synchronized to each other. In case the interaction objects 4 are active, they are synchronized to the cameras 9, and the optional illuminant 3 may be synchronized to the cameras 9.

Figure 22:
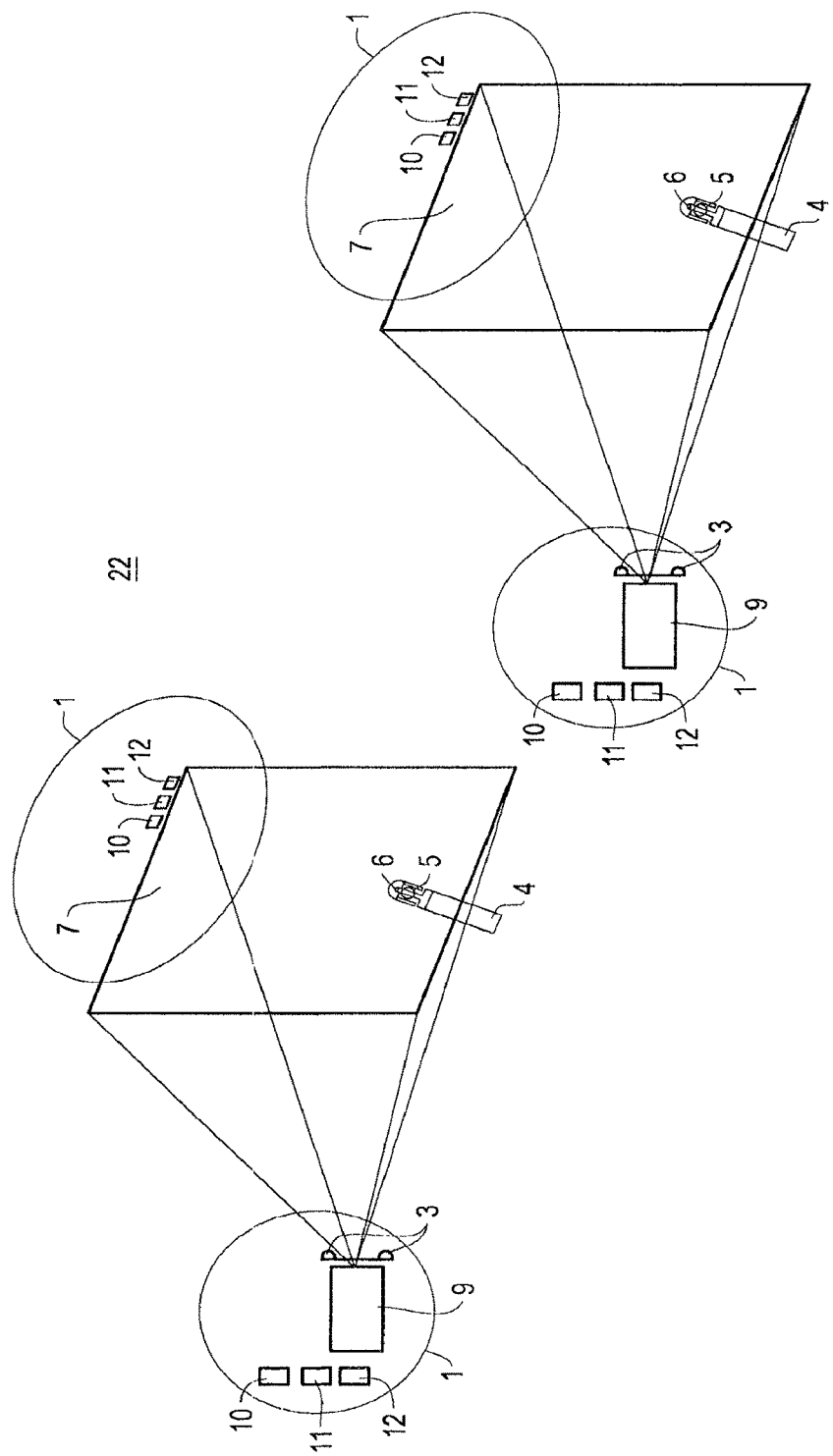
FIG. 22 is an illustration of an example configuration of the present invention, wherein the visual system is comprising two synchronized cameras and two synchronized flat panel displays, where the cameras are directed towards the interaction surfaces and synchronized flat panel displays and are capturing and tracking the interaction object's position and state over the interaction surface which is a flat panel display.

In FIG. 22 the hardware configuration includes an interactive visual system 22 comprising two units 1, which include a flat panel display 7 and two units 1 which include a camera 9 capturing the interaction surface which is the flat panel display 7 surface with an optional illuminant 3 illuminating the interaction surface and flat panel display surface 7. Each unit 1 comprises further a receiver 11, a transmitter 12, a computational and data collection means 10 like a microcontroller or an application specific digital circuit, and an interaction object 4. The interaction object 4 may comprise at least one passive optical detail 5 or one active optical detail 6, adapted to be detectable by the camera 9. The interaction device 4 may comprise all kind of combinations of passive details 5 and active details 6. In such interactive visual system 22, the cameras 9 are synchronized to each other. In case the interaction objects 4 are active, they are synchronized to the cameras 9, and the optional illuminant 3 may be synchronized to the cameras 9. All the units 1 may be synchronized.

Figure 23:
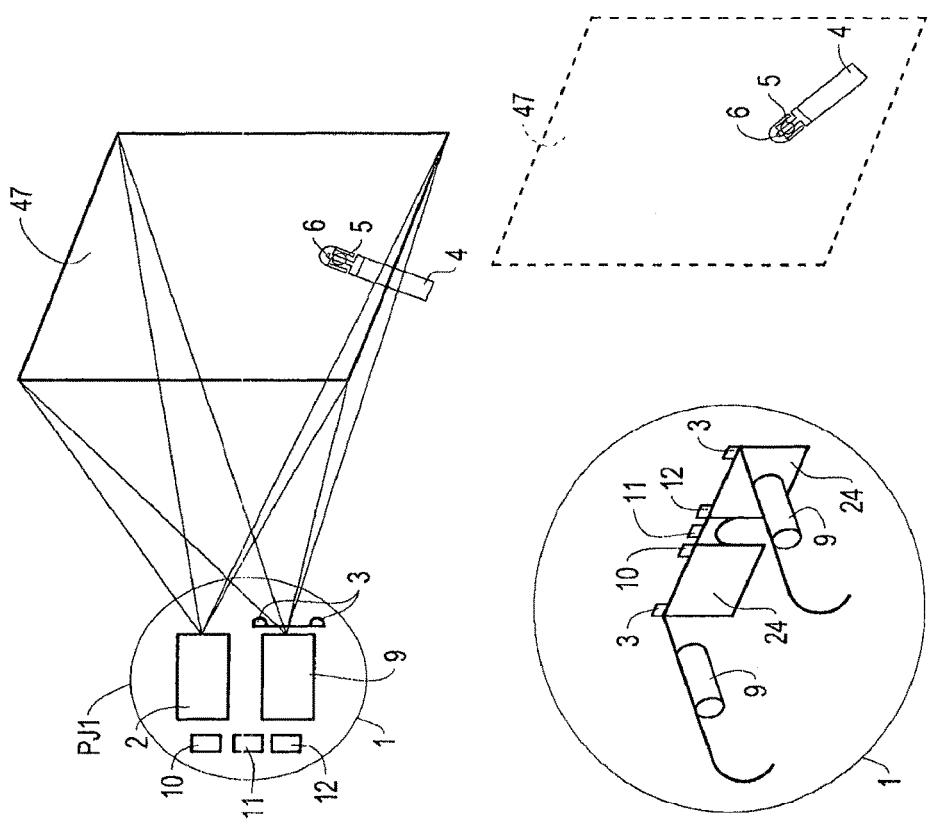
FIG. 23 is an illustration of an example configuration of the present invention, wherein the visual system is comprising one unit which is an interactive projector and one unit which is a pair of interactive semi-transparent synchronized video glasses with a virtual interaction frame.

In FIG. 23 the hardware configuration includes an interactive visual system 22 comprising two units 1, one unit is a interactive projector, here denoted PJ1, comprising a displaying device, namely a projector 2 projecting an output image onto the projection and interaction surface 47, the other unit is a wearable interactive glasses, comprising a semi-transparent display glasses 24 displaying an output image onto a virtual display and interaction surface 47, each unit further including a camera 9 capturing the projection and interaction surface 47 with an optional illuminant 3 illuminating the projection and interaction surface 47, a receiver 11, a transmitter 12, a computational and data collection means 10 like a microcontroller or an application specific digital circuit, and an interaction object 4. The interaction object 4 may comprise at least one passive optical detail 5 or one active optical detail 6, adapted to be detectable by the camera 9. The interaction device 4 may comprise all kind of combinations of passive details 5 and active details 6. In such interactive visual system 22, the cameras 9 are synchronized to each other, while the updating of the projected images from the projector 2 and the updating of the virtual display by the semi-transparent glasses 24 optionally can be synchronized for 3D and for virtual reality functions, but otherwise need not to be synchronized. In case the interaction objects 4 are active, they are synchronized to the cameras 9, and the optional illuminant 3 may be synchronized to the cameras 9.

Figure 24:
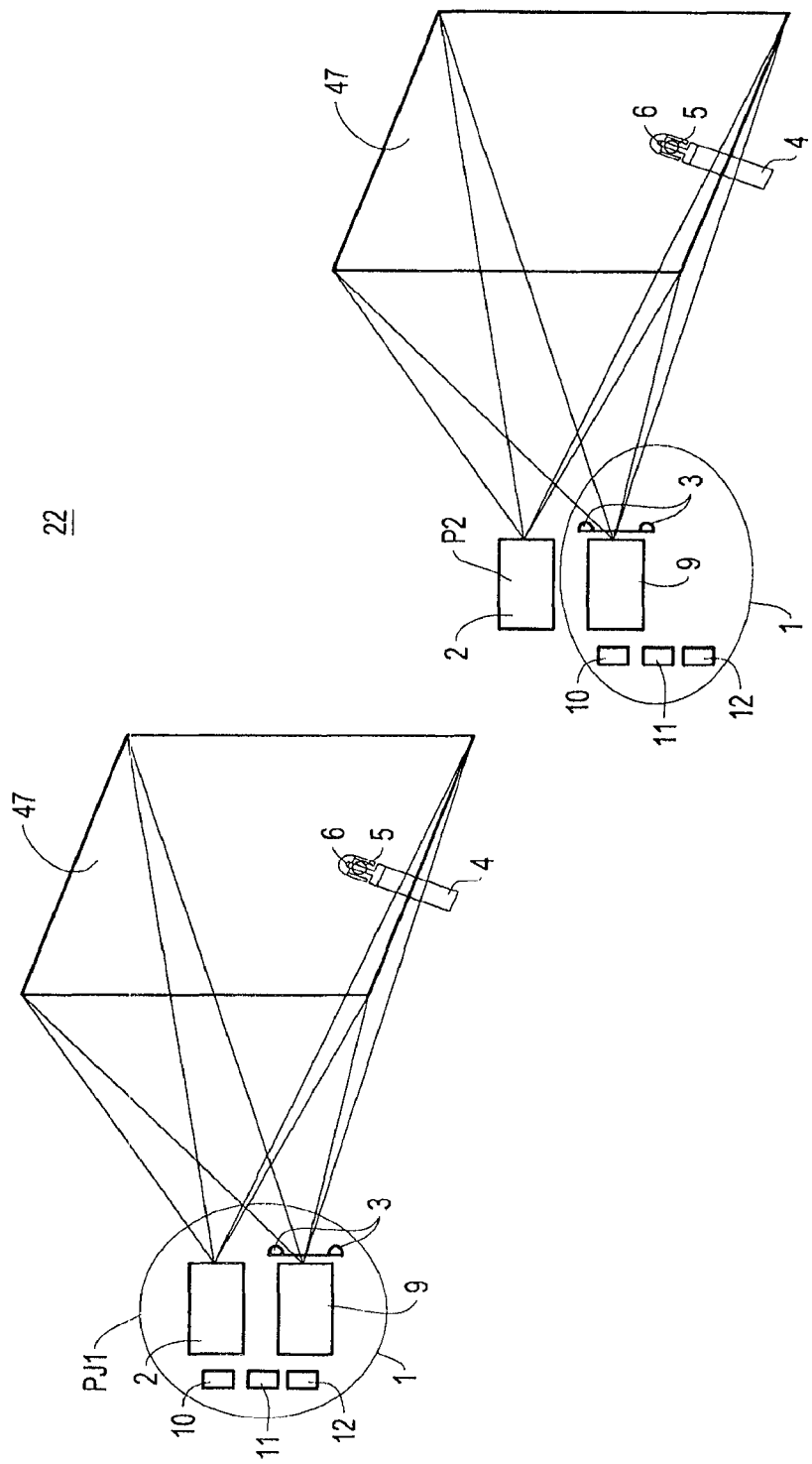
FIG. 24 is an illustration of an example configuration of the present invention, wherein the visual system is comprising one synchronized interactive projector and one synchronized interactive camera based unit aligned alongside a standard projector.

In FIG. 24 the hardware configuration includes an interactive visual system 22 comprising two or more units 1, comprising a camera 9 capturing the projection and interaction surface 47 with an optional illuminant 3 illuminating the projection and interaction surface 47, a wireless receiver 11, a wireless transmitter 12, a computational and data collection means 10 like a microcontroller or an application specific digital circuit, and an interaction object 4. The unit 1 may include a data projector 2 projecting an output image onto the projection and interaction surface 47 as in PJ1, or the unit 1 may be separated from the data projector unit 2, projecting an output image onto the projection and interaction surface 47, like P2. The interaction object 4 may comprise at least one passive optical detail 5 or one active optical detail 6, adapted to be detectable by the camera 9. The interaction device 4 may comprise all kind of combinations of passive details 5 and active details 6. In such interactive visual system 22, the cameras 9 are synchronized to each other. In case the interaction objects 4 are active, they are synchronized to the cameras 9, and the optional illuminant 3 may be synchronized to the cameras 9.

Different embodiments according to the present invention have been presented, and the advantages of the present invention is clearly illustrated based on this versatile "plug-and-play" synchronization principle, denoted the Listen and Repeat principle, which can be utilized in wired and wireless configurations, and can utilize standard low cost devices as NIR receivers and NIR LEDs typically found in remote controllers and burst-based RF receivers and senders also found in remote controllers. The exemplary configurations will only be transmitting in $3/8*500$ µs/37500 µs≈0.5% of the time, thus the use of IR/NIR remote controllers will not be affected. Burst-based RF transmitters and receivers can also be utilized, and will typically need to transmit only ⅛*60 μs/37500 μs≈0.02% of the time. This means that also the RE based remote controllers will not be affected by this synchronization.

The synchronization in a preferred embodiment may utilize infrequent short burst at least 30 ms apart and with an average burst frequency of 4 Hz, and the NIR/IR burst length can be as low as 500 μs.

The present invention is very suitable for low-cost interaction devices, for high quality and precise exposure control with available low cost microcontrollers and programmable devices. The present invention is also very suited for utilizing programmable low cost CMOS imaging sensors. The inventive scheme using the programmable function in the CMOS imaging sensor to quickly adjust the phase of the signal by temporarily changing the vertical blanking period, combined with the XVCO controlled crystal based clock synthesizer for the fine synchronization gives very fast, reliable and low cost synchronization.

Modifications to and varying combinations of the embodiments and aspects of the invention described in the foregoing are possible without departing from the scope of the invention as defined by the accompanying claims, as the various embodiments, aspects, and combinations thereof are merely preferred and are intended to be optional. Expressions such as "including", "comprising", "incorporating", "consisting of", "have", and "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

What is claimed is:

1. A visual system comprising:
   an interaction object including:
      a tip switch; and
      a light source that emits light in a flashing sequence that comprises a plurality of sub-sequences, the flashing sequence signaling a tip switch state a predetermined number of times in every sub-sequence, the predetermined number of times being different depending on an identification (ID) of the interaction object; and
   a visual apparatus configured to:
      detect a position of the light emitted from the light source; and
      analyze the flashing sequence to identify the tip switch state and identify the ID based on the predetermined number of times in every sub-sequence.

2. The visual system according to claim 1, wherein the visual apparatus includes:
   a transmitter configured to transmit a burst; and
   a camera configured to capture the light emitted from the light source in synchronization with the burst, the interaction object includes a receiver configured to receive the burst transmitted from the transmitter, and the light source emits the light in synchronization with the burst received by the receiver.

3. A visual system comprising:
   an interaction object including:
      a tip switch; and
      a light source that emits light in a flashing sequence that comprises a plurality of sub-sequences, each sub-sequence having phase 1, phase 2, and phase 3, the flashing sequence signaling an identification (ID) of the interaction object; and
   a visual apparatus configured to:
      detect a position of the light emitted from the light source; and
      analyze the flashing sequence to identify a tip switch state and the ID,
   wherein a flashing state of the light source in phase 3 is equal to a flashing state of the light source in phase 1, and a flashing state of the light source in phase 2 varies in accordance with the tip switch state, phase 2 being between phase 1 and phase 3 in each sub-sequence.

4. The visual system according to claim 3, wherein the visual apparatus includes:
   a transmitter configured to transmit a burst; and
   a camera configured to capture the light emitted from the light source in synchronization with the burst, the interaction object includes a receiver configured to receive the burst transmitted from the transmitter, and the light source emits the light in synchronization with the burst received by the receiver.

5. A method of controlling a visual system that comprises an interaction object and a visual apparatus, the interaction object including a tip switch and a light source, and the visual apparatus being configured to detect a position of light emitted from the light source, the method comprising:
   emitting, by the interaction object, the light from the light source in a flashing sequence that comprises a plurality of sub-sequences, the flashing sequence signaling a tip switch state a predetermined number of times in every sub-sequence, the predetermined number of times being different depending on an identification (ID) of the interaction object; and
   analyzing, by the visual apparatus, the flashing sequence to identify the tip switch state and identify the ID based on the predetermined number of times in every sub-sequence.

6. The method according to claim 5, further comprising:
   transmitting, by the visual apparatus, a burst;
   receiving, by the interaction object, the transmitted burst;
   emitting, by the interaction object, the light from the light source in synchronization with the received burst; and
   capturing, by the visual apparatus, the light emitted from the light source in synchronization with the burst.

7. A method of controlling a visual system that comprises an interaction object and a visual apparatus, the interaction object including a tip switch and a light source, and the visual apparatus being configured to detect a position of light emitted from the light source, the method comprising:
   emitting, by the interaction object, the light from the light source in a flashing sequence that signals an identification (ID) of the interaction object, the flashing sequence comprising a plurality of sub-sequences, each sub-sequence having phase 1, phase 2, and phase 3; and
   analyzing, by the visual apparatus, the flashing sequence to identify a tip switch state and the ID,
   wherein a flashing state of the light source in phase 3 is equal to a flashing state of the light source in phase 1, and a flashing state of the light source in phase 2 varies in accordance with the tip switch state, phase 2 being between phase 1 and phase 3 in each sub-sequence.

8. The method according to claim 7, further comprising:
   transmitting, by the visual apparatus, a burst;
   receiving, by the interaction object, the transmitted burst;

emitting, by the interaction object, the light from the light source in synchronization with the received burst; and capturing, by the visual apparatus, the light emitted from the light source in synchronization with the burst.

\* \* \* \* \*